(12) United States Patent
Squire

(10) Patent No.: US 7,080,158 B1
(45) Date of Patent: Jul. 18, 2006

(54) NETWORK CACHING USING RESOURCE REDIRECTION

(75) Inventor: Matthew Squire, Raleigh, NC (US)

(73) Assignee: Nortel Networks LImited, St. Laurent (CA)

( * ) Notice: Subject to any disclaimer, the term of this patent is extended or adjusted under 35 U.S.C. 154(b) by 0 days.

(21) Appl. No.: 09/247,192

(22) Filed: Feb. 9, 1999

(51) Int. Cl.
G06F 15/14 (2006.01)

(52) U.S. Cl. ..................... 709/245; 370/389
(58) Field of Classification Search ............. 709/245, 709/216, 226, 218, 223, 238; 711/118; 370/401, 370/389

See application file for complete search history.

(56) References Cited

U.S. PATENT DOCUMENTS

| | | | |
|---|---|---|---|
| 5,732,219 A | | 3/1998 | Blumer et al. |
| 5,867,706 A | | 2/1999 | Martin et al. |
| 5,991,760 A | | 11/1999 | Gauvin et al. |
| 6,070,184 A | * | 5/2000 | Blount et al. ............ 709/200 |
| 6,105,028 A | * | 8/2000 | Sullivan et al. ............ 707/10 |
| 6,134,581 A | | 10/2000 | Ismael et al. |
| 6,151,609 A | | 11/2000 | Truong |
| 6,167,438 A | * | 12/2000 | Yates et al. ............ 709/216 |
| 6,167,441 A | | 12/2000 | Himmel |
| 6,185,617 B1 | * | 2/2001 | Housel, III et al. ......... 709/227 |
| 6,195,622 B1 | | 2/2001 | Altschuler et al. |
| 6,205,475 B1 | * | 3/2001 | Pitts ............ 709/218 |
| 6,205,481 B1 | * | 3/2001 | Heddaya et al. ............ 709/226 |
| 6,243,760 B1 | | 6/2001 | Armbruster et al. |
| 6,266,681 B1 | * | 7/2001 | Guthrie ............ 707/501 |
| 6,393,468 B1 | | 5/2002 | McGee |
| 6,412,008 B1 | | 6/2002 | Fields et al. |
| 6,415,335 B1 | | 7/2002 | Lowery et al. |
| 6,438,125 B1 | | 8/2002 | Brothers |
| 6,438,592 B1 | | 8/2002 | Killian |
| 6,535,509 B1 | * | 3/2003 | Amicangioli ............ 370/389 |
| 6,581,061 B1 | | 6/2003 | Graham |
| 6,601,090 B1 | | 7/2003 | Gurijala et al. |
| 6,606,650 B1 | | 8/2003 | Hughes et al. |
| 6,622,157 B1 | * | 9/2003 | Heddaya et al. ............ 709/202 |

FOREIGN PATENT DOCUMENTS

| | | |
|---|---|---|
| EP | 0 801 487 A2 | 10/1997 |
| WO | WO 98/33130 | 7/1998 |
| WO | WO 98/49633 | 11/1998 |

* cited by examiner

*Primary Examiner*—Frantz B. Jean
(74) *Attorney, Agent, or Firm*—Neil G. J. Matthew

(57) ABSTRACT

A caching technique uses an interceptor situated between the client and the destination server to redirect client requests to a cache server. Specifically, the client transmits a request message that includes a reference to the intended destination server. The interceptor receives the client request and, based on the intended destination server, selects an appropriate cache server to handle the request. The interceptor then sends a response to the client including references to the cache server and to the intended destination server. Upon receiving the response, the client contacts the cache server directly using the reference included in the response.

122 Claims, 9 Drawing Sheets

NETWORK CACHING USING RESOURCE REDIRECTION

FIELD OF THE INVENTION

The present invention relates generally to communication networks, and, more particularly, to caching in a communication network.

BACKGROUND OF THE INVENTION

In today's information age, data communication networks are becoming ever more pervasive as an ever-increasing number of communication consumers require access to on-line computer resources. To that end, many data communication networks are evolving to meet the needs of these communication consumers. In order to support a large number of users, it is important for the protocols used in the data communication networks to be efficient.

A common network configuration (referred to hereinafter as the "client-server model") includes a number of client devices that communicate with a common server over the communication network. In this client-server model, each client establishes a connection to the server over the communication network. Thus, the server represents a common destination for all of its connected clients.

One problem that often arises in a client-server network involves an overloading of the server as well as the network segment on which the server resides. Such overloading can occur, for example, when many applications access the server concurrently, especially over extended periods of time. When an overload condition is present, communication over the network segment becomes slow for all applications using the network segment. Thus, a need has remained for a technique to ease overloading conditions in the communication network.

SUMMARY OF THE INVENTION

In accordance with one aspect of the invention, an interceptor situated between a client and a destination server in a communication network intercepts a request message transmitted by the client, the request message including a destination server indicator identifying the destination server. The interceptor then selects a cache server from among a number of cache servers to process the intercepted request message. The interceptor then formats a response message including a cache server indicator identifying the cache server and further identifying the server device, and transmits the response message to the client.

In a preferred embodiment of the invention, the request message is an HTTP request message containing a Universal Resource Locator for the destination server. The response message is an HTTP redirect response message including a reference to the cache server, such as a host name of the cache server or an Internet Protocol address of the cache server.

In accordance with another aspect of the invention, a cache server operating in a communication network having an interceptor situated between a client and a destination server receives from the client a request message requesting information from the destination server. The request message includes a cache server indicator including a reference to the cache server and a reference to the requested information stored in the destination server. The cache server extracts from the cache server indicator the reference to the destination server, and retrieves the requested information. Specifically, if the requested information is stored by the cache server in a cache memory, then the cache server retrieves the requested information from the cache memory. However, if the requested information is not stored by the cache server in the cache memory, then the cache server retrieves the requested information from the destination server, and stores the retrieved information in the cache memory. After retrieving the requested information, the cache server formats a response message including the requested information from the destination server, and transmits the response message to the client.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As discussed above, a need has remained for a technique to ease overloading conditions in the communication network. The present invention utilizes a novel caching technique to ease overloading conditions in the communication network. Caching involves storing frequently accessed information from a destination server on other servers within the communication network (referred to hereinafter as "cache servers") so that the information can be accessed from the cache servers without having to contact the destination server directly. Thus, when a client requests information, a cache server is contacted to retrieve the requested information, and the destination server is only contacted if the cache server does not have the requested information.

The novel caching technique of the present invention uses an interceptor situated between the client and the server to redirect client requests to a cache server. Specifically, the client transmits a request message that includes a reference to the intended destination server. The interceptor receives the client request and, based on the intended destination server, selects an appropriate cache server to handle the request. The interceptor then sends a response to the client including references to the cache server and to the intended destination server. Upon receiving the response, the client contacts the cache server directly using the reference included in the response.

Figure 1:
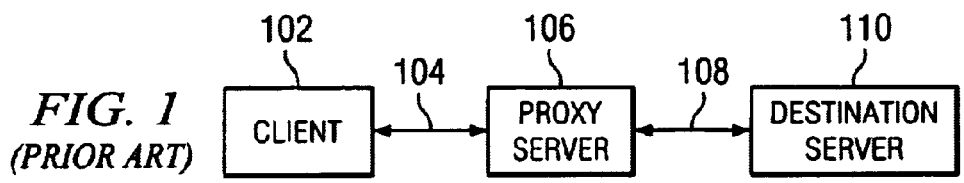
FIG. 1 is a block diagram showing a caching technique using a proxy server caching model as is known in the art.

Interceptors have been used in the past to provide other caching schemes. In one prior art embodiment, referred to hereinafter as the "proxy server model" and shown in FIG. 1, the client 102 is configured to communicate exclusively with the interceptor (referred to as a "proxy server") 106 over a network segment 104. The proxy server 106, in turn, communicates with the destination server 110 over a network segment 108, and stores information retrieved from the destination server 110 in a cache memory within the proxy server 106.

In order to obtain information from the destination server 110, the client 102 establishes a connection with the proxy server 106, and transmits a request to the proxy server 106 requesting information from the destination server 110. Upon receiving the request, the proxy server 106 determines whether or not the requested information is stored in the cache memory. If the requested information is stored in the cache memory, then the stored information is sent to the client 102. However, if the requested information is not stored in the cache memory, then the proxy server 106 retrieves the requested information from the destination server 110, stores the retrieved information in the cache memory, and sends the retrieved information to the client 102.

Figure 2:
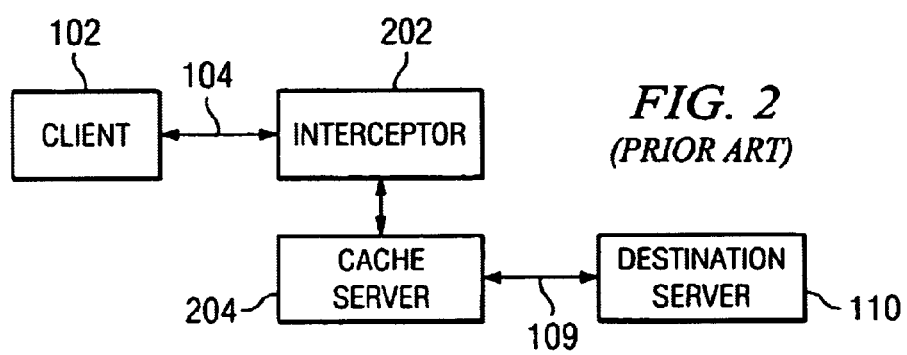
FIG. 2 is a block diagram showing a caching technique using a transparent caching model as is known in the art.

In another prior art embodiment, referred to hereinafter as the "transparent caching model" and shown in FIG. 2, the interceptor 202 transparently routes client requests to the cache server 204. The client device 102 is configured to communicate with the destination server 110. However, the interceptor 202 intercepts certain messages sent from the client 102 to the destination server 110 so as to prevent the intercepted messages from reaching the destination server 110, and redirects the intercepted messages to the cache server 204. The cache server 204 responds to the intercepted messages in place of the destination server 110 to give the appearance that the client 102 is communicating with the destination server 110 (often referred to in the art as "spoofing").

In order to obtain information from the destination server 110, the client 102 first attempts to establish a connection with the destination server 110 by transmitting a number of messages to the destination server 110. The interceptor 202 intercepts the client messages to the destination server 110, and redirects the intercepted messages to the cache server 204. The cache server 204 responds to the client messages in place of the destination server 110. Thus, a connection is effectively established between the client 102 and the cache server 204.

Once the connection is established, the client 102 transmits a request to the destination server 110 requesting information from the destination server 110. The interceptor 202 intercepts the request, and redirects the request to the cache server 204.

When the cache server 204 receives the redirected request, the cache server 204 determines whether or not the requested information is stored in its cache memory. If the requested information is not stored in the cache memory, then the cache server 204 retrieves the requested information from the destination server 110 and stores the retrieved information in the cache memory. The cache server 204 sends a response, including the requested information, to the interceptor 202. The interceptor 202 forwards the response to the client 102.

In the transparent caching model, an address translation function is used to redirect the request and response messages between the client 102 and the cache server 204. Each request and response message includes, among other things, a source address indicating the address of the sending device and a destination address indicating the address of the destination device. Typically, the request message sent by the client 102 includes, as the source address, the address of the client 102, and, as the destination address, the address of the destination server 110. In order for the client 102 to accept and process the response message, the client 102 typically requires that the response message includes, as the source address, the address of the destination server 110, and, as the destination address, the address of the client 102. Since the request message is processed by the interceptor 202 and the cache server 204 and not by the destination server 110, either the interceptor 202 or the cache server 204 (or both) must perform address translations to create the appearance that the response was generated by the destination server 110.

In one exemplary embodiment of the transparent caching model, wherein the cache server 204 is located remotely from the interceptor 202, the interceptor 202 performs a first address translation to re-route the intercepted request to the cache server 204. Typically, this first address translation involves the interceptor 202 changing the destination address in the request to be the address of the cache server 204, but leaving the source address unchanged. Upon receiving the re-routed request, the cache server 204 sends a response having, as the source address, the address of the cache server 204, and, as the destination address, the address of the client 102. The response is routed through the interceptor 202, which performs a second address translation by changing the source address in the response to be the address of the destination server 110 and sends the response to the client 102.

In another exemplary embodiment of the transparent caching model, wherein the cache server 204 communicates directly with the interceptor 202, the interceptor 202 re-routes the intercepted request to the cache server 204 without changing the destination address in the request. Upon receiving the re-routed request, the cache server 204 sends a response having, as the source address, the address of the destination server 110, and, as the destination address, the address of the client 102. The response is sent to the client 102 without requiring the interceptor 202 to perform any address translation.

Of course, other transparent caching embodiments utilizing different address translations are possible. The transparent caching model certain desirable characteristics. One desirable characteristic of the transparent caching model is that the caching function is transparent to the end user. Another desirable characteristic of the transparent caching model is that the interceptor is not required to cache any information itself. Unfortunately, transparent caching implementations are typically complex, due particularly to the interception and re-routing functions that must be performed. Therefore, a caching model that provides transparent caching without requiring the interceptor to cache any information itself, and without requiring any rerouting would clearly be valuable.

Figure 3:
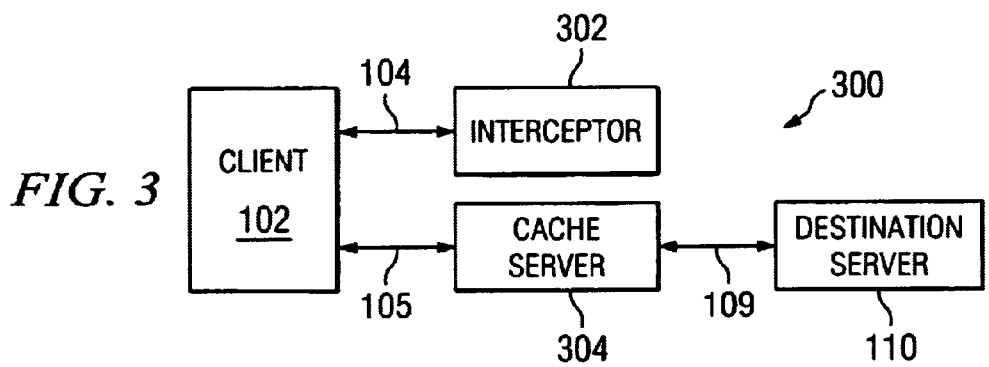
FIG. 3 is a block diagram showing a novel caching technique using a redirection model in accordance with the present invention.

An embodiment in accordance with the present invention, referred to hereinafter as the "redirection model" and shown in FIG. 3, supports a transparent caching function without requiring the interceptor 302 to cache any information itself, and without requiring any re-routing by the interceptor 302. Specifically, the interceptor 302 performs a "spoofing" function by intercepting and responding to messages from the client 102 to the destination server 110. However, instead of re-routing requests to the cache server 304, the interceptor 302 redirects the client 102 to the cache server 304 so that the client 102 can thereafter contact the cache server 304 directly. More specifically, when the interceptor 302 intercepts a request from the client 102 requesting information from the destination server 110, the interceptor 302 selects an appropriate cache server 304 to handle the request, and then sends a response to the client 102 including a reference to the cache server 304. Upon receiving the response, the client 102 contacts the cache server 304 directly using the reference included in the response.

Thus, the client 102 transmits a first request to the interceptor 302 over the network segment 104 requesting information from the destination server 110. When the interceptor 302 receives the first request, the interceptor 302 selects the cache server 304 from among a number of cache servers, and sends a response to the client 102 over the network segment 104 including a reference to the cache server 304.

When the client 102 receives the response from the interceptor 302, the client 102 contacts the cache server 304 directly by sending to the cache server 304 over the network segment 105 a second request including at least the reference to the intended destination server 110. The network segment 105 may be the same network segment as the network segment 104, or the network segment 105 may be a different network segment than the network segment 104.

When the cache server 304 receives the second client request, the cache server 304 first determines whether or not the requested information is stored in its cache memory. If the requested information is stored in the cache memory, then the stored information is sent to the client 102. However, if the requested information is not stored in the cache memory, then the cache server 304 retrieves the requested information from the destination server 110, stores the retrieved information in the cache memory, and sends the retrieved information to the client 102.

Figure 4:
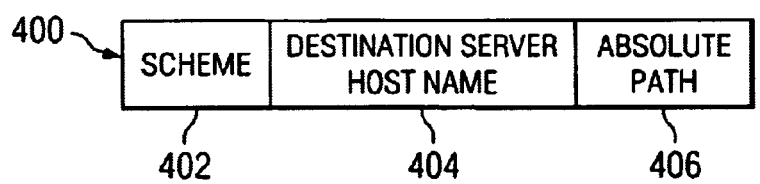
FIG. 4 is a block diagram showing the format of a Universal Resource Locator as is known in the art.

In a preferred embodiment of the present invention, the redirection model is applied to caching in the context of "web" browsing (i.e., applications for accessing information over the over the World Wide Web). In the World Wide Web, pages of information (referred to hereinafter as "web pages") are stored in servers such as the destination server 110. Each web page is identified by a unique Universal Resource Locator ("URL"). As shown in FIG. 4, a typical URL 400 includes a scheme 402 indicating the protocol being used to retrieve the information (typically the HyperText Transfer Protocol or HTTP, described in more detail below), a destination server host name 404 indicating the name of the destination server 110, and an absolute path 406 indicating a directory and file name where the information is stored on the destination server 110. The destination server host name 404 can be either a domain name with which the destination server 110 is associated or an Internet Protocol address of the destination server 10. The text string "http://www.destination-server.com/directory/filename" is an example of a fictitious URL 400, where "http" is the scheme 402, "www.destination-server.com" is the destination server host name (domain name) 404, and "/directory/filename" is the absolute path 406.

In a preferred embodiment of the present invention, web pages are retrieved by the client 102 using the HyperText Transfer Protocol (HTTP), which is described in an Internet Engineering Task Force (IETF) Internet-Draft (work in progress) document entitled *HyperText Transfer Protocol—HTTP/1.1* and referenced as document "draft-ietf-http-v11-spec-rev-05," incorporated herein by reference in its entirety, and referred to hereinafter as the "HTTP Protocol Specification." HTTP is a request/response protocol that is typically used in conjunction with the Transmission Control Protocol (TCP) and the Internet Protocol (IP). Specifically, HTTP requests and responses are transported in TCP segments, which in turn are transported in IP datagrams having a source IP address and a destination IP address. HTTP, TCP, and IP are well-known protocols.

In order to retrieve information from the destination server 110, specifically a particular web page stored in the destination server 110, the client 102 transmits an HTTP GET request to the destination server 110. The HTTP GET request includes, among other things, a resource identifier and a host name. The resource identifier and the host name together identify a specific web page stored in the destination server 110. The resource identifier is preferably equal to the absolute path 406 from the URL 400. The host name is preferably equal to the destination server host name 404 from the URL 400, and may also include a protocol port number corresponding to the scheme 402 from the URL 400 (the default HTTP port number is 80). The HTTP GET request may also include a referer field that allows the client 102 to indicate a web page from which the host name and resource identifier were obtained, specifically by including as the referer field the URL for the web page.

The HTTP response includes, among other things, a status code for indicating a status for the corresponding HTTP request. One range of status code values are used to redirect the client 102 to another server and/or web page that is indicated in the HTTP response, typically by including the URL for the other server and/or web page in the HTTP response. For convenience, an HTTP response having a status code redirecting the client 102 to another server and/or web page is referred to as an "HTTP redirect response," and the particular field in the HTTP redirect response containing the URL for the other server and/or web page is referred to as the "location field."

In a typical HTTP client-server implementation, the destination server 110 might use the HTTP redirect response to redirect the client 102 to another server, for example, when the destination server 110 is unable to service the HTTP request. This use of the HTTP redirect response requires that the HTTP request reach the destination server 110 and that an HTTP response be sent back to the client 102. While the destination server 110 could use the HTTP redirect response to redirect the client 102 to a cache server such as the cache server 304, such a use of the HTTP redirect response does not support a transparent caching function in the context of the present invention, since the client 102 must still communicate directly with the destination server 110 in order to be redirected to the cache server 304.

Figure 5:
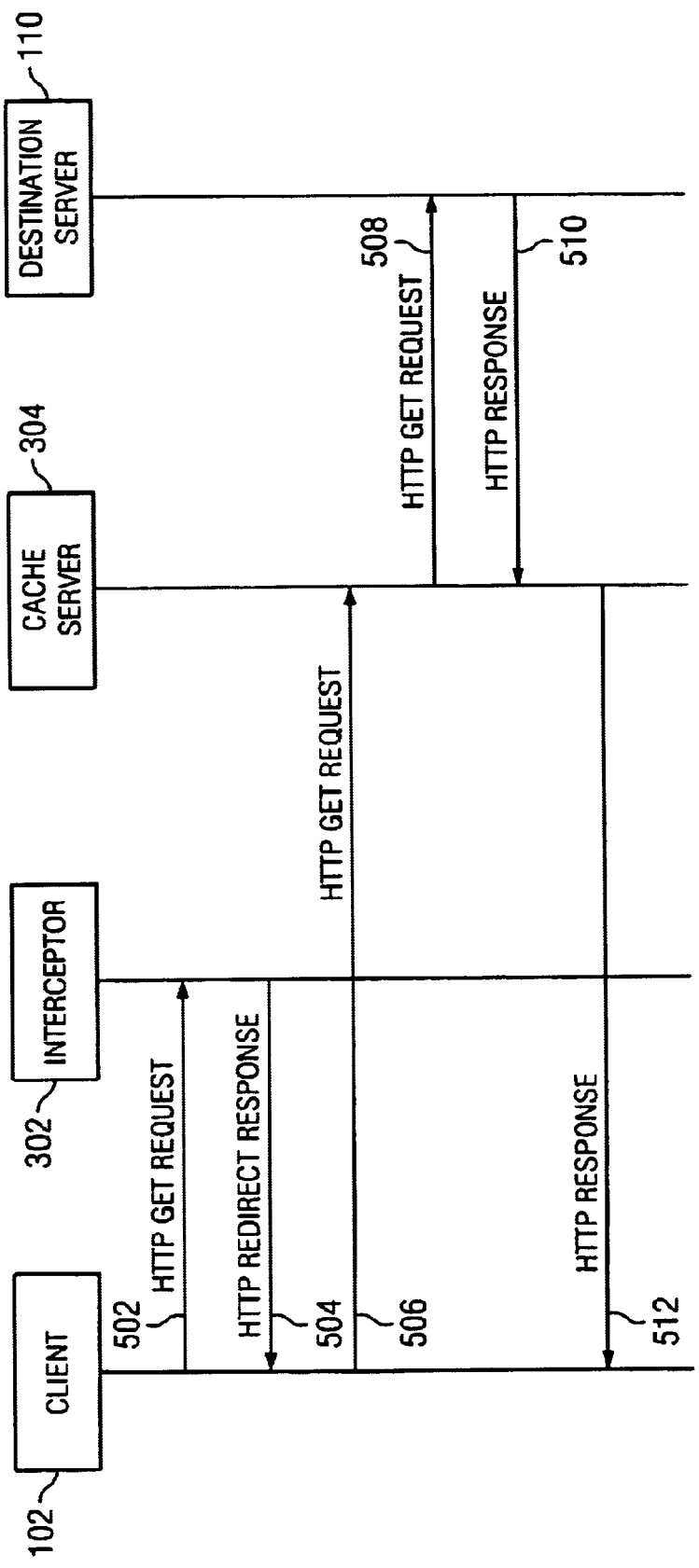
FIG. 5 is a message flow diagram showing the redirection technique of the present invention.

In a preferred embodiment of the present invention, the interceptor 302 utilizes the HTTP redirect response in a unique way to provide transparent caching without requiring the interceptor 302 to cache any information itself, and without requiring re-routing by the interceptor 302. As shown in FIG. 5, the client 102 transmits a first HTTP GET request 502 to the destination server 110. The first HTTP GET request 502 includes a host name and a resource identifier that together identify a specific web page stored in the destination server 10. The interceptor 302 intercepts the first HTTP GET request 502, and sends an HTTP redirect response 504 redirecting the client 102 to the cache server 304. The HTTP redirect response 504 includes at least a cache server host name allowing the client 102 to identify the cache server 304, and may also include the destination server host name and/or absolute path for the requested information so that the client 102 can convey that information to the cache server 304.

Upon receiving the HTTP redirect response 504, the client 102 sends a second HTTP GET request 506 to the cache server 304 in order to obtain the requested information. The second HTTP GET request 506 includes certain information that allows the cache server 304 to determine the destination server host name and absolute path for the requested information.

Upon receiving the second HTTP GET request 506, the cache server 304 determines the destination server host name and absolute path for the requested information. The cache server 304 then determines whether the requested information is stored in its cache memory. If the requested information is not stored in the cache memory, then the cache server 304 sends a third HTTP GET request 508 to the destination server 110, and receives from the destination server an HTTP response 510 including the requested information. The cache server 304 sends an HTTP response 512 to the client 102 including the requested information.

Even though the client 102 receives the HTTP redirect response 504 and must redirect the request to the cache server 304 by transmitting the second HTTP GET request 506, the caching function of the redirection model is considered to be transparent because the client 102, and particularly the HTTP application in the client 102 (i.e., the web browser), typically performs the redirection automatically, without any operator intervention or other prompting by an end user. Thus, the redirection of the client 102 to the cache server 304 occurs transparently to the end user even though it is not transparent to the client 102.

Figure 6A:
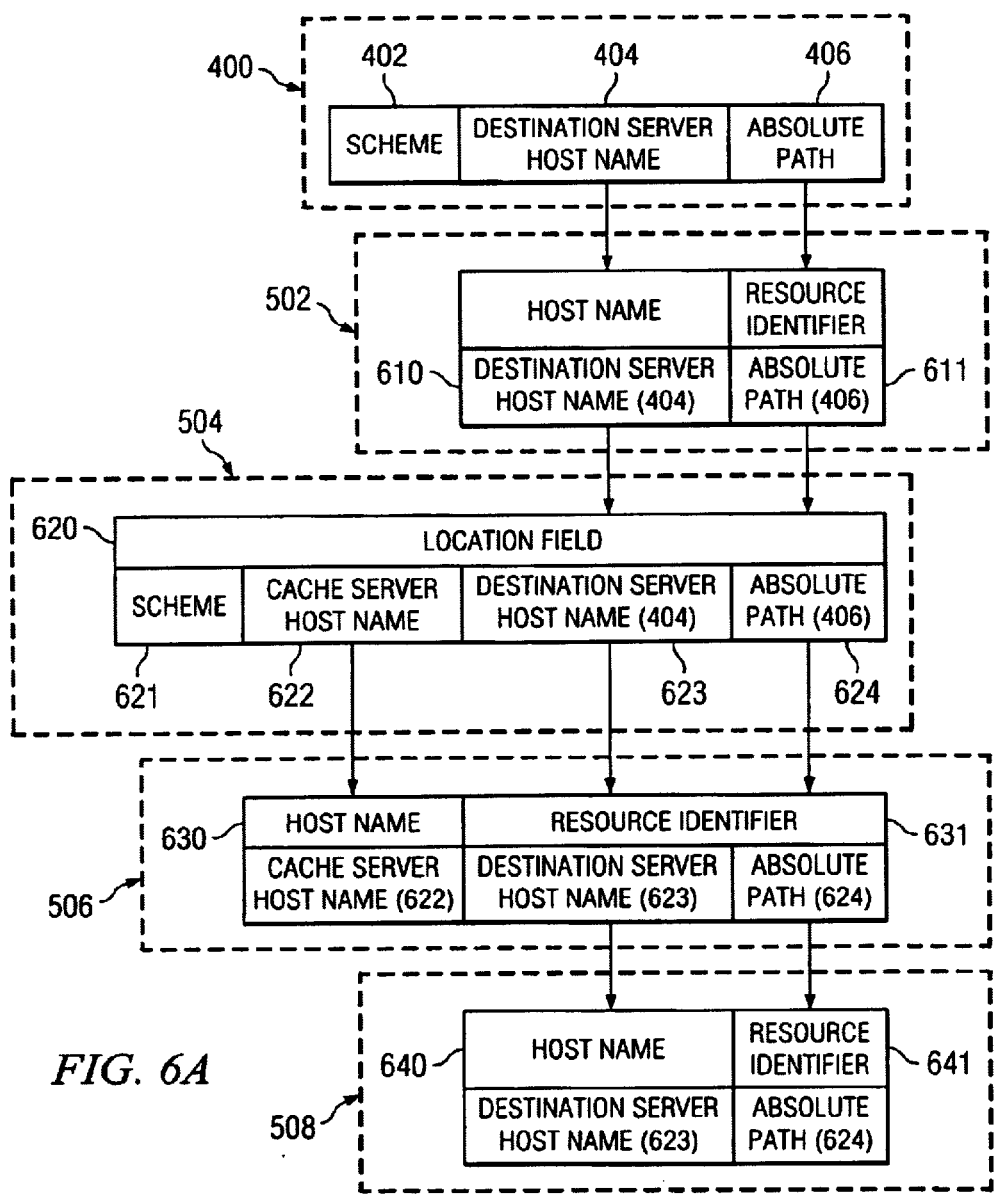
FIG. 6A is a block diagram showing specific HTTP message formats used in a first exemplary embodiment of the present invention.

FIG. 6A shows specific HTTP message formats used in a first exemplary embodiment of the present invention in which the destination server host name and absolute path are conveyed to the cache server 304 within the resource identifier field of the second HTTP GET request 506. Specifically, the interceptor 302 formats the HTTP redirect response 504 to include, among other things, the cache server host name, the destination server host name, and the absolute path formatted in such a way that the client 102 interprets the cache server host name to be the host name for the second HTTP GET request 506, and interprets the destination server host name and the absolute path to be the resource identifier for the second HTTP GET request 506. The cache server 304 is able to extract the destination server host name and absolute path from the resource identifier in the second HTTP GET request 506.

In order to retrieve a web page stored in the destination server 110 and identified by a URL 400 (for example "http://www.destination-server.com/directory/filename"), using the technique shown in FIG. 6A, the client 102 transmits the first HTTP GET request 502 requesting information from the destination server 110. The first HTTP GET request 502 includes, among other things, a source address equal to the address of the client 102, a destination address equal to the address of the destination server 110, a host name 610 equal to the destination server host name 404 from the URL 400 (i.e., "www.destination-server.com"), and a resource identifier 611 equal to the absolute path 406 from the URL 400 (i.e., "/directory/filename").

The interceptor 302 intercepts the first HTTP request 502, and uses the destination server host name 404 (and optionally the absolute path 406) from the first HTTP request 502 to select the cache server 304 from among a number of cache servers, and more particularly from a list of cache servers maintained by the interceptor 302. The interceptor 302 then formats the HTTP redirect response 504, and sends the HTTP redirect response 504 to the client 102. The HTTP redirect response 504 includes, among other things, a source address equal to the address of the destination server 110, a destination address equal to the address of the client 102, and a location field including a cache server indicator 620 referring the client 102 to the cache server 304. The preferred cache server indicator 620 includes a scheme 621 (i.e., "http"), a cache server host name 622 indicating the host name of the cache server 304 (e.g., "www.cache-server.com"), a destination server host name 623 equal to the host name 610 from the first HTTP GET request 502 (i.e., "www.destination-server.com"), and an absolute path 624 equal to the resource identifier 611 from the first HTTP GET request 502 (i.e., "/directory/filename"). Thus, the text string "http://www.cache-server.com/www.destination-server.com/directory/filename" is an example of a fictitious cache server indicator 620 in accordance with the preferred embodiment of the present invention.

When the client 102 receives the HTTP redirect response 504 from the interceptor 302, the client 102 transmits the second HTTP GET request 506 to the cache server 304. The second HTTP GET request 506 includes, among other things, a source address equal to the address of the client 102, a destination address equal to the address of the cache server 304, a host name 630 equal to the cache server host name 622 from the cache server indicator 620 (i.e., "www.cacheserver.com"), and a resource identifier 631 equal to the destination server host name 623 and absolute path 624 from the cache server indicator 620 (i.e., "/www.destination-server.com/directory/filename").

When the cache server 304 receives the second HTTP request 506, the cache server 304 extracts the destination server host name 623 (i.e., "www.destination-server.com") and absolute path 624 (i.e., "/directory/filename") from the resource identifier 631, and uses the destination server host name 623 and absolute path 624 to determine whether or not the requested information is stored in its cache memory. If the requested information is not stored in the cache memory, then the cache server 304 retrieves the requested information from the destination server 110 (described in detail below) and stores the retrieved information in the cache memory.

The cache server 304 sends the HTTP response 512 to the client 102. The HTTP response 512 includes, among other things, a source address equal to the address of the cache server 304, a destination address equal to the address of the client 102, and the requested information that was either stored in the cache memory or retrieved from the destination server 110.

In order to retrieve the requested information from the destination server 110, the cache server 304 sends the third HTTP GET request 508 to the destination server 110. The third HTTP GET request 508 includes, among other things, a source address equal to the address of the cache server 304, a destination address equal to the address of the destination server 110, a host name 640 equal to the destination server host name 623 from the resource identifier 631 (i.e., "www.destination-server.com"), and a resource identifier 641 equal to the absolute path 624 from the resource identifier 631 (i.e., "/directory/filename"). The cache server 304 receives the second HTTP response 510 from the destination server 110. The second HTTP response 510 includes, among other things, a source address equal to the address of the destination server 110, a destination address equal to the address of the cache server 304, and the requested information.

Figure 6B:
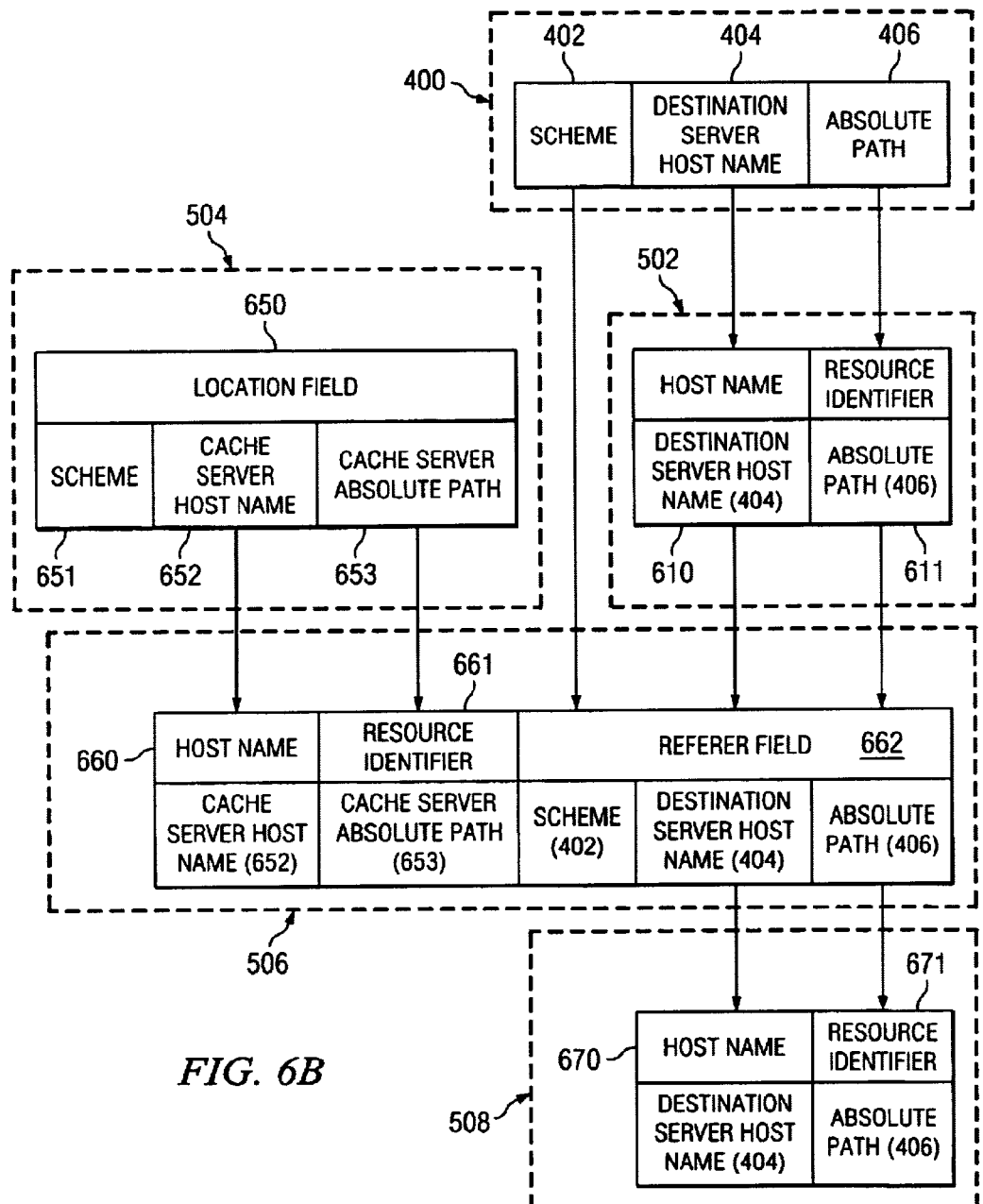
FIG. 6B is a block diagram showing specific HTTP message formats used in a second exemplary embodiment of the present invention.

FIG. 6B shows specific HTTP message formats used in a second exemplary embodiment of the present invention in which the destination server host name and absolute path are conveyed to the cache server 304 within the referer field of the second HTTP GET request 506. Specifically, the interceptor 302 formats the HTTP redirect response 504 to include the cache server host name without including the destination server host name or absolute path. Upon receiving the HTTP redirect response 504, the client 102 formats the second HTTP GET request 506 to include the destination server host name and absolute path in the referer field. The cache server 304 is able to extract the destination server host name and absolute path from the referer field in the second HTTP GET request 506.

In order to retrieve a web page stored in the destination server 110 and identified by a URL 400 (for example "http://www.destination-server.com/directory/filename"), using the technique shown in FIG. 6B, the client 102 transmits the first HTTP GET request 502 requesting information from the destination server 110. The first HTTP GET request 502 includes, among other things, a source address equal to the address of the client 102, a destination address equal to the address of the destination server 110, the host name 610 equal to the destination server host name 404 from the URL 400 (i.e., "www.destination-server.com"), and the resource identifier 611 equal to the absolute path 406 from the URL 400 (i.e., "/directory/filename").

The interceptor 302 intercepts the first HTTP request 502, and uses the destination server host name 404 (and optionally the absolute path 406) from the first HTTP request 502 to select the cache server 304 from among a number of cache servers, and more particularly from a list of cache servers maintained by the interceptor 302. The interceptor 302 then formats the HTTP redirect response 504, and sends the HTTP redirect response 504 to the client 102. The HTTP redirect response 504 includes, among other things, a source address equal to the address of the destination server 110, a destination address equal to the address of the client 102, and a location field including a cache server indicator 650 referring the client 102 to the cache server 304. The preferred cache server indicator 650 includes a scheme 651 (i.e., "http"), a cache server host name 652 indicating the host name of the cache server 304 (e.g., "www.cache-server.com"), and a cache server absolute path 653 indicating a directory and filename. Thus, the text string "http://www.cache-server.com/cache-directory/cache-filename" is an example of a fictitious cache server indicator 650 in accordance with this embodiment of the present invention.

When the client 102 receives the HTTP redirect response 504 from the interceptor 302, the client 102 transmits the second HTTP GET request 506 to the cache server 304. The second HTTP GET request 506 includes, among other things, a source address equal to the address of the client 102, a destination address equal to the address of the cache server 304, a host name 660 equal to the cache server host name 652 from the cache server indicator 650 (i.e., "www.cacheserver.com"), a resource identifier 661 equal to the cache server absolute path 653 from the cache server indicator 650 (i.e., "/cache-directory/cache-filename"), and a referer field 662 equal to the URL 400 (i.e., "http://www.destination-server.com/directory/filename").

When the cache server 304 receives the second HTTP request 506, the cache server 304 may use the resource identifier 661 to select, or otherwise route the second HTTP request 506 to, specific internal logic that processes redirected requests such as the second HTTP request 506.

The cache server 304, and more particularly the selected internal logic, extracts the destination server host name 404 (i.e., "www.destination-server.com") and absolute path 406 (i.e., "/directory/filename") from the referer field 662, and uses the destination server host name 404 and absolute path 406 to determine whether or not the requested information is stored in its cache memory. If the requested information is not stored in the cache memory, then the cache server 304 retrieves the requested information from the destination server 110 (described in detail below) and stores the retrieved information in the cache memory. The cache server 304 sends the HTTP response 512 to the client 102. The HTTP response 512 includes, among other things, a source address equal to the address of the cache server 304, a destination address equal to the address of the client 102, and the requested information that was either stored in the cache memory or retrieved from the destination server 110.

In order to retrieve the requested information from the destination server 110, the cache server 304 sends the third HTTP GET request 508 to the destination server 110. The third HTTP GET request 508 includes, among other things, a source address equal to the address of the cache server 304, a destination address equal to the address of the destination server 110, a host name 670 equal to the destination server host name 404 from the referer field 662 (i.e., "www.destination-server.com"), and a resource identifier 671 equal to the absolute path 406 from the referer field 662 (i.e., "/directory/filename"). The cache server 304 receives the second HTTP response 510 from the destination server 110. The second HTTP response 510 includes, among other things, a source address equal to the address of the destination server 110, a destination address equal to the address of the cache server 304, and the requested information.

The exemplary embodiment shown and described with reference to FIG. 6B presumes that all clients, including the client 102, include the referer field in the redirected request, and include the destination server host name and absolute path in the referer field. Unfortunately, the HTTP Protocol Specification does not require a client to include the referer field, and, moreover, many client implementations do not support such a use of the referer field. Therefore, such an exemplary embodiment is not practical using existing clients, but would be practical if all clients are upgraded or modified to include the referer field as described.

Figure 6C:
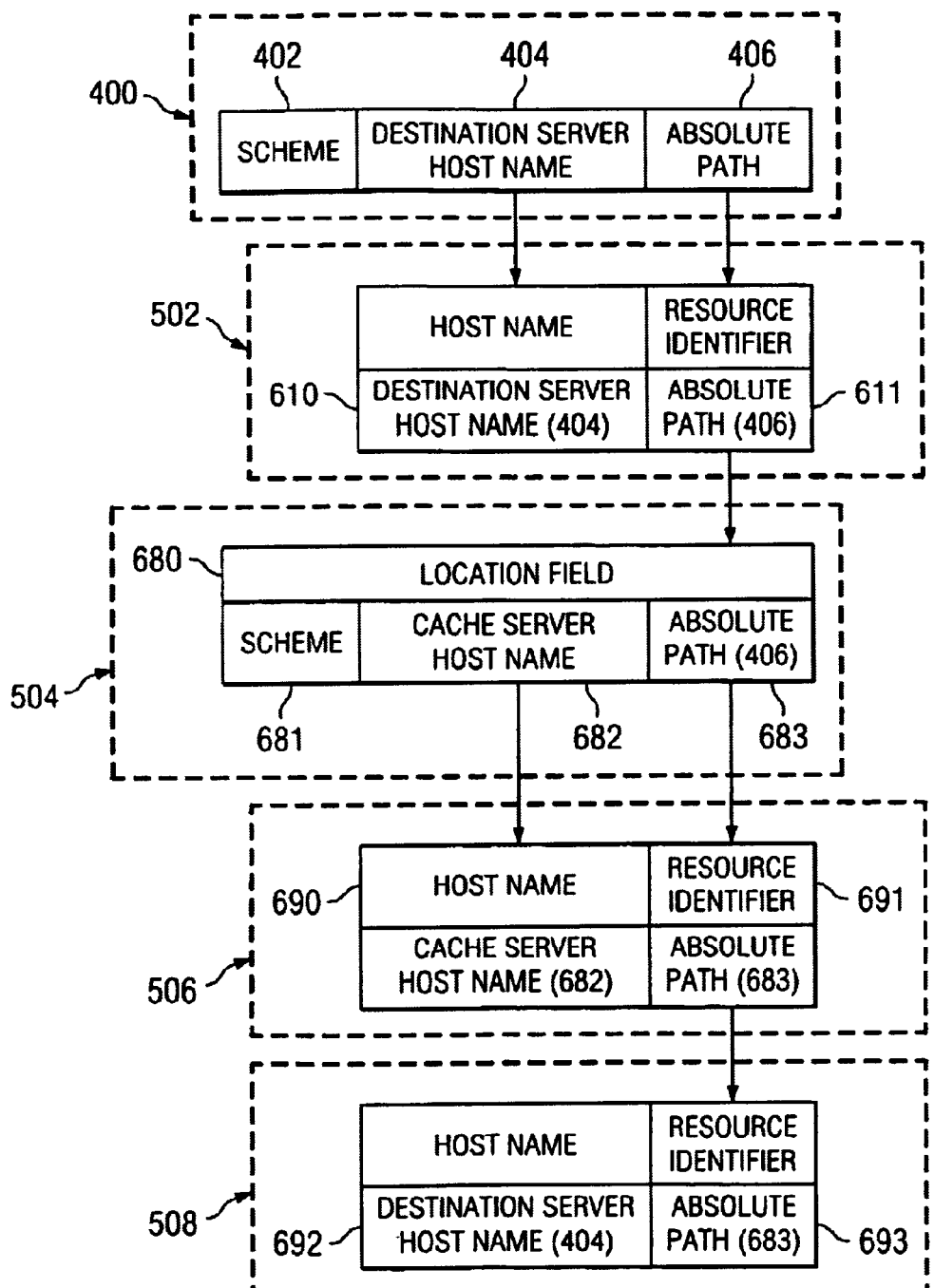
FIG. 6C is a block diagram showing specific HTTP message formats used in a third exemplary embodiment of the present invention.

FIG. 6C shows specific HTTP message formats used in a third exemplary embodiment of the present invention in which the destination server host name and absolute path are conveyed to the cache server 304 by mapping the destination server host name to a unique cache server host name, and including the unique cache server host name and the absolute path in the second HTTP GET request 506. Specifically, the interceptor 302 formats the HTTP redirect response 504 to include the unique cache server host name and the absolute path. Upon receiving the HTTP redirect response 504, the client 102 formats the second HTTP GET request 506 to include, as the host name, the unique cache server host name, and as the resource identifier, the absolute path. The cache server 304 is able to determine the destination server host name from its mapping to the unique cache server host name, and is able to extract the absolute path from the resource identifier field in the second HTTP GET request 506.

In order to retrieve a web page stored in the destination server 110 and identified by a URL 400 (for example "http://www.destination-server.com/directory/filename"), using the technique shown in FIG. 6C, the client 102 transmits the first HTTP GET request 502 requesting information from the destination server 110. The first HTTP GET request 502 includes, among other things, a source address equal to the address of the client 102, a destination address equal to the address of the destination server 110, the host name 610 equal to the destination server host name 404 from the URL 400 (i.e., "www.destination-server.com"), and the resource identifier 611 equal to the absolute path 406 from the URL 400 (i.e., "/directory/filename").

The interceptor 302 intercepts the first HTTP request 502, and uses the destination server host name 404 (and optionally the absolute path 406) from the first HTTP request 502 to select, from among a number of cache server host names associated with the cache server 304, a cache server host name that uniquely maps to the destination server host name 404. The interceptor 302 then formats the HTTP redirect response 504, and sends the HTTP redirect response 504 to the client 102. The HTTP redirect response 504 includes, among other things, a source address equal to the address of the destination server 110, a destination address equal to the address of the client 102, and a location field including a cache server indicator 680 referring the client 102 to the cache server 304. The preferred cache server indicator 680 includes a scheme 681 (i.e., "http"), the selected cache server host name 682 that uniquely maps to the destination server host name 404 (e.g., "www.cache-server.com"), and an absolute path 683 equal to the absolute path 406 from the resource identifier 611. Thus, the text string "http://www.cacheserver.com/directory/filename" is an example of a fictitious cache server indicator 680 in accordance with this embodiment of the present invention.

When the client 102 receives the HTTP redirect response 504 from the interceptor 302, the client 102 transmits the second HTTP GET request 506 to the cache server 304. The second HTTP GET request 506 includes, among other things, a source address equal to the address of the client 102, a destination address equal to the address of the cache server 304, a host name 690 equal to the cache server host name 682 from the cache server indicator 680 (i.e., "www.cacheserver.com"), and a resource identifier 691 equal to the absolute path 683 from the cache server indicator 680 (i.e., "/directory/filename").

When the cache server 304 receives the second HTTP request 506, the cache server 304 determines the destination server host name 404 (i.e., "www.destination-server.com") based on the cache server host name 682 from the host name 690 or other means (for example, based on an IP address), and extracts the absolute path 683 (i.e., "/directory/filename") from the resource identifier 691. The cache server 304 uses the destination server host name 404 and absolute path 683 to determine whether or not the requested information is stored in its cache memory. If the requested information is not stored in the cache memory, then the cache server 304 retrieves the requested information from the destination server 110 (described in detail below) and stores the retrieved information in the cache memory. The cache server 304 sends the HTTP response 512 to the client 102. The HTTP response 512 includes, among other things, a source address equal to the address of the cache server 304, a destination address equal to the address of the client 102, and the requested information that was either stored in the cache memory or retrieved from the destination server 110.

In order to retrieve the requested information from the destination server 110, the cache server 304 sends the third HTTP GET request 508 to the destination server 110. The third HTTP GET request 508 includes, among other things, a source address equal to the address of the cache server 304, a destination address equal to the address of the destination server 110, a host name 692 equal to the destination server host name 404 (i.e., "www.destination-server.com"), and a resource identifier 693 equal to the absolute path 683 from the resource identifier 691 (i.e., "/directory/filename"). The cache server 304 receives the second HTTP response 510 from the destination server 110. The second HTTP response 510 includes, among other things, a source address equal to the address of the destination server 110, a destination address equal to the address of the cache server 304, and the requested information.

Figure 6D:
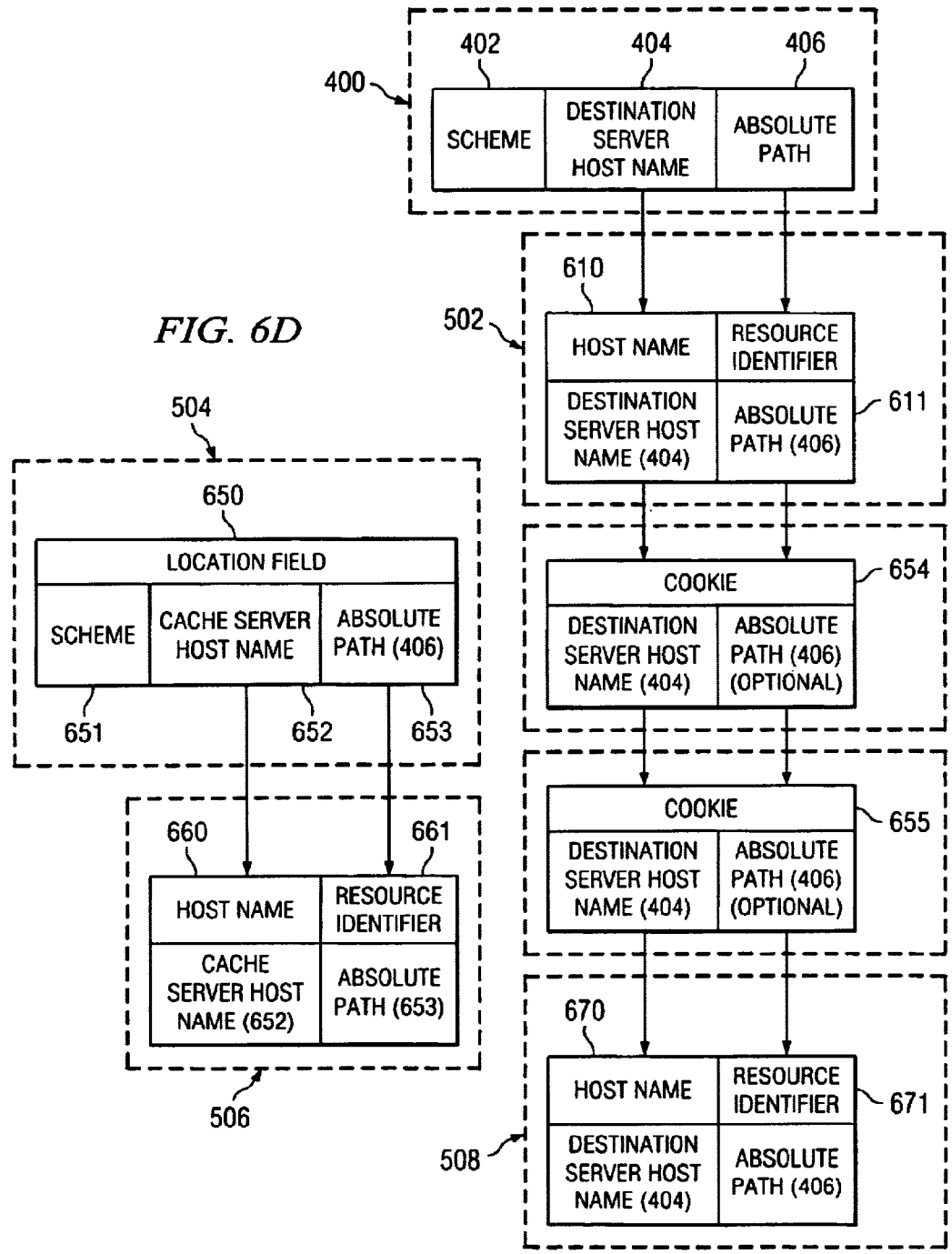
FIG. 6D is a block diagram showing specific HTTP message formats used in a fourth exemplary embodiment of the present invention.

FIG. 6D shows specific HTTP message formats used in a fourth exemplary embodiment of the present invention in which the destination server host name, and optionally the absolute path, is conveyed to the cache server 304 within a cookie field 655 in the second HTTP GET request 506. Specifically, the interceptor 302 formats the HTTP redirect response 504 to include a cookie field 654 including at least the destination server host name 404. The interceptor 302 also includes the absolute path 406 in the cookie field 654 if the cache server absolute path 653 is different than the absolute path 406 (although the cache server absolute path 653 is typically identical to the absolute path 406). Upon receiving the HTTP redirect response 504, the client 102 copies the cookie field from the HTTP redirect response 504 into the second HTTP GET request 506. The cache server 304 is able to extract the destination server host name 404 from the cookie field in the second HTTP GET request 506. The cache server 304 is able to extract the absolute path 406 from the cookie field in the second HTTP GET request 506, if the absolute path 406 is included in the cookie field 655, or from the cache server absolute path 653 in the location field 650 in the second HTTP GET request 506. Although cookie fields are not defined in the HTTP Protocol Specification, they are supported by most commercial HTTP implementations.

In order to retrieve a web page stored in the destination server 110 and identified by a URL 400 (for example "http://www.destination-server.com/directory/filename"), using the technique shown in FIG. 6D, the client 102 transmits the first HTTP GET request 502 requesting information from the destination server 110. The first HTTP GET request 502 includes, among other things, a source address equal to the address of the client 102, a destination address equal to the address of the destination server 110, the host name 610 equal to the destination server host name 404 from the URL 400 (i.e., "www.destination-server.com"), and the resource identifier 611 equal to the absolute path 406 from the URL 400 (i.e., "/directory/filename"). The interceptor 302 intercepts the first HTTP request 502, and uses the destination server host name 404 (and optionally the absolute path 406) from the first HTTP request 502 to select the cache server 304 from among a number of cache servers, and more particularly from a list of cache servers maintained by the interceptor 302. The interceptor 302 then formats the HTTP redirect response 504, and sends the HTTP redirect response 504 to the client 102. The HTTP redirect response 504 includes, among other things, a source address equal to the address of the destination server 110, a destination address equal to the address of the client 102, a location field including a cache server indicator 650 referring the client 102 to the cache server 304, and a cookie field 654. The preferred cache server indicator 650 includes a scheme 651 (i.e., "http"), a cache server host name 652 indicating the host name of the cache server 304 (e.g., "www.cacheserver.com"), and a cache server absolute path 653 indicating a directory and filename. The cache server absolute path 653 is typically, although not necessarily, identical to the absolute path 406. The preferred cookie field 654 includes the destination server host name 404 from the first HTTP GET request 502, and optionally includes the absolute path 406 from the first HTTP GET request 502 if the cache server absolute path 653 is different than the absolute path 406. Thus, the text string "http://www.cache-server.com/cache-directory/cache-filename" is an example of a fictitious cache server indicator 650 in accordance with this embodiment of the present invention, and the text string "www.destination-server.com/directory/filename" is an example of a fictitious cookie field 654 (which includes the absolute path 406) in accordance with this embodiment of the present invention.

When the client 102 receives the HTTP redirect response 504 from the interceptor 302; the client 102 transmits the second HTTP GET request 506 to the cache server 304. The second HTTP GET request 506 includes, among other things, a source address equal to the address of the client 102, a destination address equal to the address of the cache server 304, a host name 660 equal to the cache server host name 652 from the cache server indicator 650 (i.e., "www.cacheserver.com"), a resource identifier 661 equal to the cache server absolute path 653 from the cache server indicator 650 (i.e., "/cache-directory/cache-filename"), and a cookie field 655 equal to the cookie field 654 from the HTTP redirect response 504 (i.e., "www.destination-server.com/directory/filename").

When the cache server 304 receives the second HTTP request 506, the cache server 304 may use the resource identifier 661 to select, or otherwise route the second HTTP request 506 to, specific internal logic that processes redirected requests such as the second HTTP request 506.

The cache server 304, and more particularly the selected internal logic, extracts the destination server host name 404 (i.e., "www.destination-server.com") from the cookie field 655, extracts the absolute path 406 (i.e., "/directory/filename") from either the location field 650 or the cookie field 655, and uses the destination server host name 404 and absolute path 406 to determine whether or not the requested information is stored in its cache memory. If the requested information is not stored in the cache memory, then the cache server 304 retrieves the requested information from the destination server 110 (described in detail below) and stores the retrieved information in the cache memory. The cache server 304 sends the HTTP response 512 to the client 102. The HTTP response 512 includes, among other things, a source address equal to the address of the cache server 304, a destination address equal to the address of the client 102, and the requested information that was either stored in the cache memory or retrieved from the destination server 110.

In order to retrieve the requested information from the destination server 110, the cache server 304 sends the third HTTP GET request 508 to the destination server 110. The third HTTP GET request 508 includes, among other things, a source address equal to the address of the cache server 304, a destination address equal to the address of the destination server 110, a host name 670 equal to the destination server host name 404 (i.e., "www.destination-server.com"), and a resource identifier 671 equal to the absolute path 406 (i.e., "/directory/filename"). The cache server 304 receives the second HTTP response 510 from the destination server 110. The second HTTP response 510 includes, among other things, a source address equal to the address of the destination server 110, a destination address equal to the address of the cache server 304, and the requested information.

Figure 7:
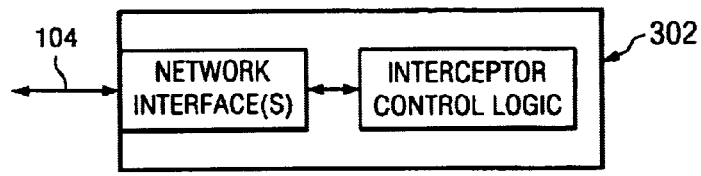
FIG. 7 is a block diagram showing an exemplary interceptor in accordance with the present invention.
Figure 8:
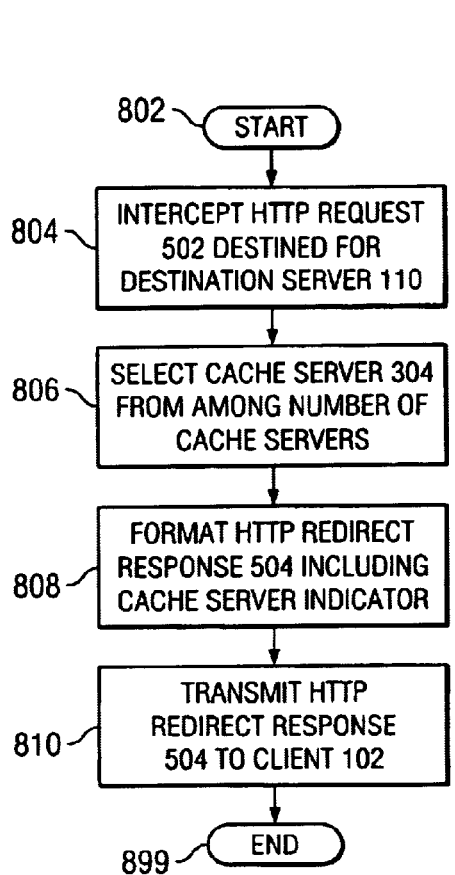
FIG. 8 is a logic flow diagram describing interceptor control logic for redirecting a request to a cache server in accordance with the present invention.

FIG. 7 is a block diagram of an exemplary interceptor 302 in accordance with a preferred embodiment of the present invention. The interceptor 302 includes interceptor control logic 704 that is coupled to a number of network interfaces 702. The interceptor 302, and particularly the interceptor control logic 704, includes logic for performing the steps shown in FIG. 8. After beginning in step 802, the interceptor 302 intercepts the HTTP GET request 502 from the client 102 destined for the destination server 110, in step 804. As described previously, the HTTP GET request 502 includes, among other things, a source address equal to the address of the client 102, a destination address equal to the address of the destination server 110, a host name 610 equal to the destination server host name 404, and a resource identifier 611 equal to the absolute path 406.

After intercepting the HTTP GET request 502 in step 804, the interceptor control logic 704 selects the cache server 304 from among the number of cache servers, in step 806. The interceptor control logic 704 then formats the HTTP redirect response 504, in step 808. As described previously, the HTTP redirect response 504 includes, among other things, the source address equal to the address of the destination server 110, the destination address equal to the address of the client 102, the cache server indicator (620, 650, 680) referring the client 102 to the cache server 304, and optionally the cookie field 654. The cache server indicator 620, as described with reference to FIG. 6A, includes the scheme 621, the cache server host name 622, the destination server host name 623, and the absolute path 624. The cache server indicator 650, as described with reference to FIGS. 6B and 6D, includes the scheme 651, the cache server host name 652, and the cache server absolute path 653. The cache server indicator 680, as described with reference to FIG. 6C, includes the scheme 681, the cache server host name 682, and the absolute path 683. The cookie field 654, as described with reference to FIG. 6D, includes the destination server host name 404, and optionally includes the absolute path 406. The interceptor control logic 704 transmits the formatted HTTP redirect response 504 to the client 102, in step 810, and terminates in step 899.

In a preferred embodiment of the present invention, the interceptor control logic 704 formats the HTTP redirect response 504 in step 808 using an HTTP redirect response message template that is maintained in a memory. The interceptor control logic 704 formats the cache server indicator (620, 650, 680) and optionally the cookie field 654. The interceptor control logic 704 then inserts the cache server indicator (620, 650, 680) and optionally the cookie field 654 into the HTTP redirect response message template to form the complete HTTP redirect response. The interceptor control logic 704 sends the HTTP redirect response 504 to the client 102 in step 810 by adding the appropriate TCP and IP headers, including a source IP address equal to the IP address of the destination server 110 and a destination IP address equal to the IP address of the client 102.

In order for the interceptor control logic 704 to intercept an HTTP GET request message, such as the HTTP GET request 502, the interceptor control logic 704 must distinguish the HTTP GET request message from among a multitude of messages received by the interceptor 302. Specifically, the interceptor control logic 704 must first determine that the message is an HTTP message as opposed to a different protocol message. In accordance with a preferred embodiment of the present invention, HTTP messages are distinguishable from other protocol messages by a unique TCP port number reserved for HTTP, specifically TCP port number 80. Therefore, the interceptor control logic 704 identifies an HTTP message based on the TCP port number in the TCP segment.

Once the interceptor control logic 704 determines that the message is an HTTP message, the interceptor control logic 704 must determine that the HTTP message is a request message as opposed to a response message. In accordance with a preferred embodiment of the present invention, each HTTP message includes a start line that indicates, among other things, whether the HTTP message is a request message or a response message. Therefore, the interceptor control logic 704 identifies an HTTP request message based on the start line of the HTTP message.

Once the interceptor control logic 704 determines that the HTTP message is an HTTP request message, the interceptor control logic 704 must determine that the HTTP request message is an HTTP GET request message as opposed to a different type of HTTP request message. In accordance with a preferred embodiment of the present invention, the start line of the HTTP request message includes a message type indicator indicating whether the HTTP message is an HTTP GET request message or another type of HTTP request message. Therefore, the interceptor control logic 704 identifies the HTTP GET request message based on the message type indicator in the start line of the HTTP request message.

Even when the interceptor 302 identifies an HTTP GET request message, though, the interceptor 302 cannot automatically intercept and redirect the HTTP GET request message. If the HTTP GET request message is addressed either to or from one of the number of cache servers, such as the cache server 304 (which might occur, for example, if the interceptor 302 performs routing functions such that all messages destined for either the destination server 110 or the cache server 304 are routed through the interceptor 302), then the interceptor 302 does not intercept and redirect the HTTP GET request message. Rather, the interceptor 302 allows the HTTP GET request message to proceed to its destination without being intercepted and redirected. Therefore, the interceptor 302 only intercepts and redirects those HTTP GET request messages that are not addressed either to or from one of the number of cache servers. All other messages, including HTTP GET request messages addressed either to or from one of the number of cache servers, are allowed to proceed without being intercepted and redirected.

Figure 9A:
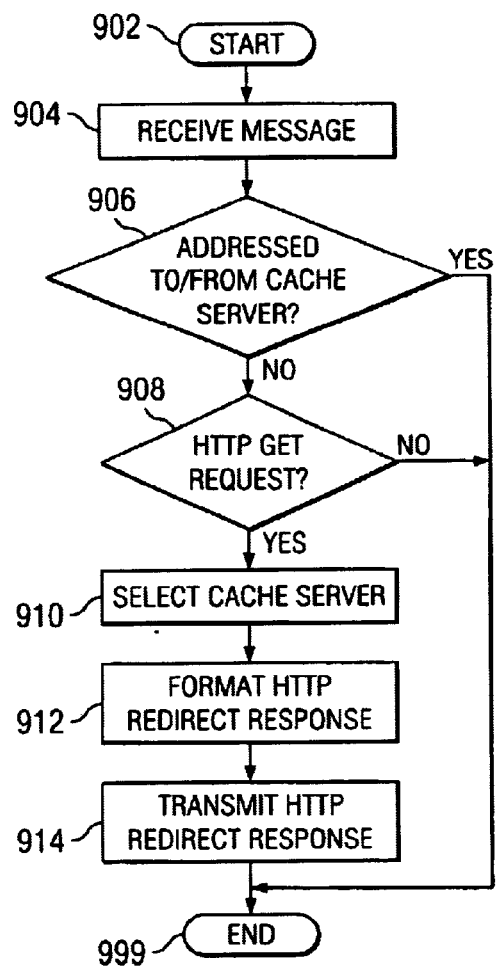
FIG. 9A is a logic flow diagram describing interceptor control logic for processing multiprotocol messages in accordance with the present invention.

FIG. 9A is a logic flow diagram describing interceptor control logic 704 in greater detail. After beginning in step 902, the interceptor control logic 704 receives a message, in step 904. The interceptor control logic 704 first determines whether the source address or the destination address in the message is equal to a cache server address, in step 906. If either the source address or the destination address is equal to a cache server address (YES in step 906), then the interceptor control logic 704 terminates in step 999 without intercepting and redirecting the message. If neither the source address nor the destination address is equal a cache server address (NO in step 906), then the interceptor control logic 704 proceeds to determine whether the message is an HTTP GET request message, in step 908, specifically by examining the TCP port number to determine whether the message is an HTTP message, and if the message is an HTTP message, further examining the start line of the HTTP message to determine whether the HTTP message is an HTTP GET request message. If the message is not an HTTP GET request message (NO in step 908), then the interceptor control logic 704 terminates in step 999 without intercepting and redirecting the message. If the message is an HTTP GET request message (YES in step 908), then the interceptor control logic 704 intercepts and redirects the message. Specifically, the interceptor control logic 704 selects the cache server 304 from among the number of cache servers, in step 910. The interceptor control logic 704 then formats the HTTP redirect response 504 including the cache server indicator (620, 650, 680) and optionally the cookie field 654, in step 912. The interceptor control logic 704 transmits the HTTP redirect response 504 to the client 102, in step 914, and terminates in step 999.

One implementation consideration for the interceptor control logic 704 is the handling of the connection between the client 102 and the interceptor 302. As described previously with reference to the transparent caching model, in order for the client 102 to obtain information from the destination server 110 (i.e., before the client 102 transmits the first HTTP GET request 502), the client 102 first attempts to establish a connection with the destination server 110 by transmitting a number of messages to the destination server 110. In the transparent caching model, the interceptor 202 redirects the client messages to the cache server 204 so that the client 102 effectively establishes a connection with the cache server 204. However, in the redirection model, the interceptor 302 intercepts and responds to the client messages in place of the destination server 110, and therefore the interceptor 302 effectively establishes a connection with the client 102 before the client 102 transmits the first HTTP GET request message. In a preferred embodiment of the present invention, which uses HTTP, the connection is a TCP connection, and the client messages used to establish the connection are TCP control messages.

One implementation option for the interceptor control logic 704 is to maintain state information for the connection as it would if the interceptor 302 had been the intended destination for the connection. Maintaining state information involves maintaining a TCP finite state machine for the connection as well as complying with the TCP protocol specification. While maintaining TCP state information for the connection ensures a reliable delivery service for the HTTP requests and responses between the client 102 and the interceptor 302, it also adds a level of complexity to the interceptor control logic 704. Since the interceptor 302 is typically capable of supporting many connections, the added level of complexity can overload the interceptor 302 when a large number of connections are active simultaneously, and also limits the number of connections that can be supported by the interceptor 302.

In an embodiment wherein the interceptor control logic 704 maintains state information for the connection, the interceptor 302 must be a single point of connectivity between the client 102 and the destination server 110. This is because the interceptor 302 needs to receive all messages sent by the client 102 to the destination server 110 in order to perform the redirection to the cache server 304.

An alternative implementation option for the interceptor control logic 704 is to not maintain state information for the connection. In this case, the interceptor control logic 704 responds to messages received from the client 102 by sending an appropriate response to the client 102, but otherwise does not maintain a TCP finite state machine for the connection. The resulting implementation provides an unreliable delivery service for the HTTP requests and responses (i.e., lost TCP segments will not be retransmitted).

From the perspective of the interceptor 302, the only important pieces of information in the HTTP GET request 502 are the host name and resource identifier, which are used to select the cache server 304. Since most HTTP requests fit within a single IP datagram, it is expected that the complete host name and resource identifier will be contained within a single TCP segment, even if the HTTP request is segmented into multiple TCP segments. Thus, the interceptor control logic 704 monitors the TCP segments for a first HTTP GET request segment including the host name and resource identifier, and responds to that first HTTP GET request segment by selecting a cache server, formatting an HTTP redirect response, and sending the formatted HTTP redirect response to the client 102 according to the described methods of the present invention. Other TCP segments (i.e., subsequent HTTP segments and non-HTTP segments) are acknowledged (according to the TCP specification), but are otherwise discarded.

Even though this alternative implementation option utilizes an unreliable delivery service, the redirection function of the present invention works as long as the interceptor 302 receives the first segment of a segmented HTTP GET request including the host name and resource identifier.

If the first segment of the segmented HTTP request is lost, however, the subsequent segments will be acknowledged by the interceptor 302 via a TCP acknowledge, but no HTTP redirect response will be sent by the interceptor 302. In this case, the client 102 will not receive an HTTP response to its HTTP request, and the client 102 eventually gives up after waiting for a specified period of time. Thus, the decreased level of complexity from not maintaining state information for the connection is realized at the cost of increased timeouts for client requests. This trade-off may be acceptable in networks where lost IP datagrams are uncommon (for example, small campus networks), but may not be acceptable in wide-area networks or in networks where discarded IP datagrams are common.

In an embodiment wherein the interceptor control logic 704 does not maintain state information for the connection, the interceptor 302 need not be a single point of connectivity between the client 102 and the destination server 110, as long as each route from the client 102 to the destination server 110 includes an interceptor such as the interceptor 302. This is because the interceptor 302 processes individual client messages without reference to a TCP state. Thus, an interceptor that receives a first HTTP GET request segment including the host name and resource identifier sends an HTTP redirect response to the client 102, while other interceptors that receive subsequent HTTP GET request segments simply acknowledge and discard the segments.

Figure 9B:
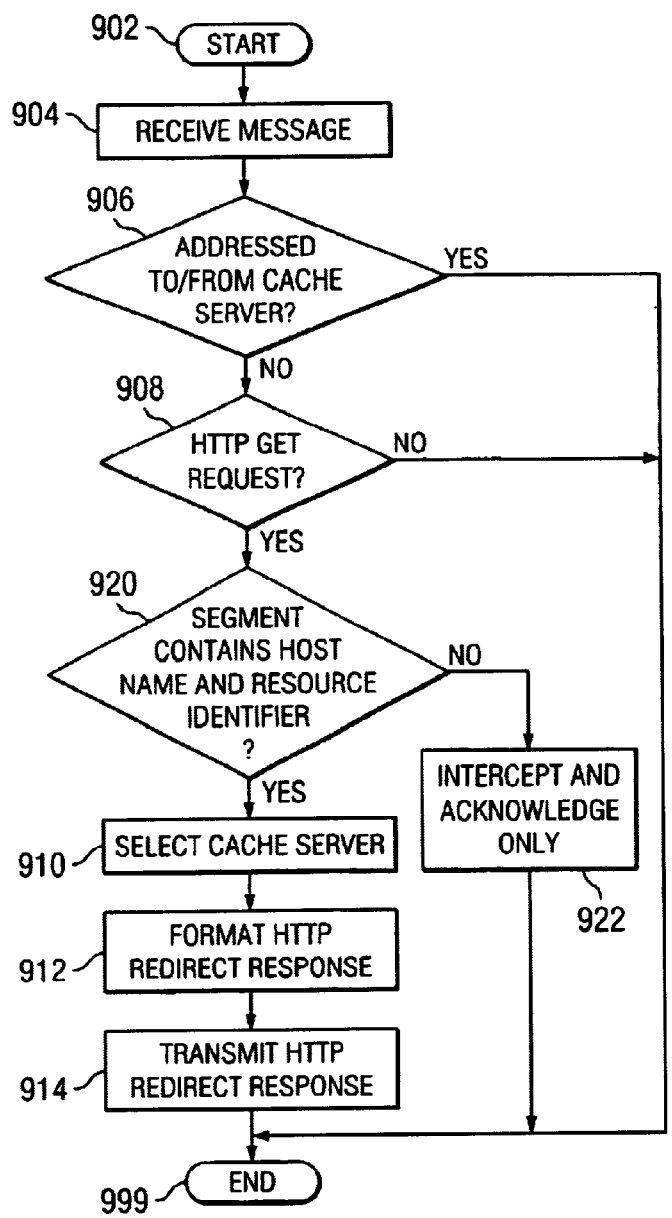
FIG. 9B is a logic flow diagram describing interceptor control logic for processing segmented messages in accordance with the present invention.

FIG. 9B is a logic flow diagram describing interceptor control logic 704 in accordance with an embodiment wherein the interceptor control logic 704 does not maintain state information for the connection. After beginning in step 902, the interceptor control logic 704 receives a message, in step 904. The interceptor control logic 704 first determines whether the source address or the destination address in the message is equal to a cache server address, in step 906. If either the source address or the destination address is equal to a cache server address (YES in step 906), then the interceptor control logic 704 terminates in step 999 without intercepting and redirecting the message. If neither the source address nor the destination address is equal a cache server address (NO in step 906), then the interceptor control logic 704 proceeds to determine whether the message is an HTTP GET request message, in step 908. If the message is not an HTTP GET request message (NO in step 908), then the interceptor control logic 704 terminates in step 999 without intercepting and redirecting the message. If the message is an HTTP GET request message (YES in step 908), then the interceptor control logic 704 proceeds to determine whether the HTTP request message contains the host name and resource identifier, in step 920. If the HTTP request message contains the host name and resource identifier (YES in step 920, then the interceptor control logic 704 intercepts and redirects the HTTP request. Specifically, the interceptor control logic 704 selects the cache server 304 from among the number of cache servers, in step 910. The interceptor control logic 704 then formats the HTTP redirect response 504 including the cache server indicator (620, 650, 680) and optionally the cookie field 654, in step 912. The interceptor control logic 704 transmits the HTTP redirect response 504 to the client 102, in step 914, and terminates in step 999. However, if the HTTP request message does not contain the host name and resource identifier (NO in step 920), then the interceptor control logic intercepts and acknowledges (i.e., via a TCP acknowledge) the message without transmitting an HTTP redirect response, in step 922, and terminates in step 999.

Figure 10:
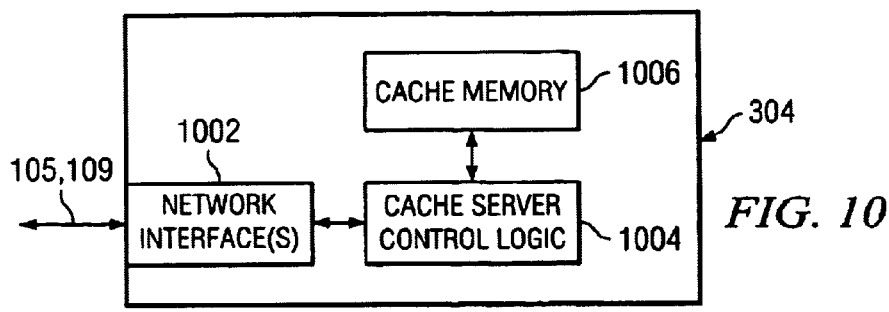
FIG. 10 is a block diagram showing an exemplary cache server in accordance with the present invention.

FIG. 10 is a block diagram showing an exemplary cache server 304 in accordance with a preferred embodiment of the present invention. The cache server 304 includes cache server control logic 1004 that is coupled to a number of network interfaces 1002 as well as to a cache memory 1006. The cache server control logic 1004 receives an HTTP GET request, extracts the destination server host name and absolute path from the HTTP GET request, uses the destination server host name and absolute path to retrieve the requested information, and sends an HTTP response including the requested information.

In prior art embodiments, such as the proxy server model and the transparent caching model, the HTTP GET request is an original request (rather than a redirected request) in which the destination server host name is included in the host name field of the HTTP GET request. Therefore, the cache server (or proxy server) includes logic for extracting the destination server host name from the host name field of the HTTP GET request.

In a preferred embodiment, the HTTP GET request is a redirected request in which the destination server host name is not included in the host name field of the HTTP GET request. Rather, the destination server host name is included within other fields of the HTTP GET request. Therefore, the cache server 304 includes logic for extracting the destination server host name from these other fields of the HTTP GET request.

Figure 11:
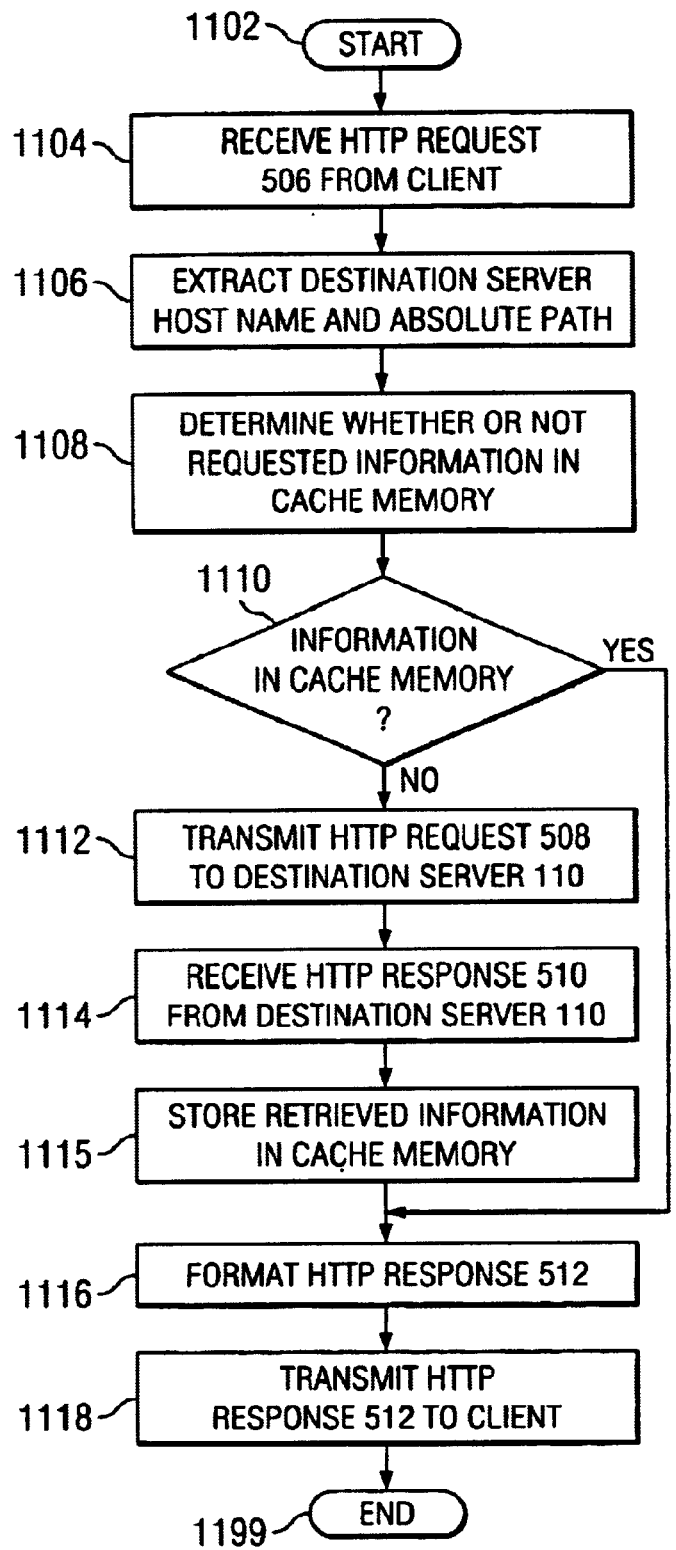
FIG. 11 is a logic flow diagram describing cache server logic for processing a redirected request to the cache server in accordance with the present invention.

Thus, the cache server 304, and particularly the cache server control logic 1004, includes logic for performing the steps shown in FIG. 11. After beginning in step 1102, the cache server control logic 1004 receives an HTTP GET request (i.e., the second HTTP GET request 506), in step 1104. In a first exemplary embodiment of the present invention, as described with reference to FIG. 6A above, the HTTP GET request 506 includes, among other things, the source address equal to the address of the client 102, the destination address equal to the address of the cache server 304, the host name 630 equal to the cache server host name 622, and the resource identifier 631 equal to the destination server host name 623 and the absolute path 624. In a second exemplary embodiment of the present invention, as described with reference to FIG. 6B above, the HTTP GET request 506 includes, among other things, the source address equal to the address of the client 102, the destination address equal to the address of the cache server 304, the host name 660 equal to the cache server host name 652, the resource identifier 661 equal to the cache server absolute path 653, and the referer field 662 equal to the URL 400. In a third exemplary embodiment of the present invention, as described with reference to FIG. 6C above, the HTTP GET request 506 includes, among other things, the source address equal to the address of the client 102, the destination address equal to the address of the cache server 304, the host name 690 equal to the cache server host name 682, and the resource identifier 691 equal to the absolute path 683. In a fourth exemplary embodiment of the present invention, as described with reference to FIG. 6D above, the HTTP GET request 506 includes, among other things, the source address equal to the address of the client 102, the destination address equal to the address of the cache server 304, the host name 660 equal to the cache server host name 652, the resource identifier 661 equal to the cache server absolute path 653, and the cookie field 655 including the destination server host name 404 and optionally the absolute path 406.

After receiving the HTTP GET request 506 in step 1104, the cache server control logic 1004 extracts the destination server host name and absolute path from HTTP GET request, in step 1106. In a first exemplary embodiment of the present invention, as described with reference to FIG. 6A above, the destination server host name 623 and absolute path 624 are extracted from the resource identifier 631. In a second exemplary embodiment of the present invention, as described with reference to FIG. 6B above, the destination server host name 404 and absolute path 406 are extracted from the referer field 662. In a third exemplary embodiment of the present invention, as described with reference to FIG. 6C above, the destination server host name 404 is determined from the cache server host name 682 or other means (such as an IP address), and the absolute path 683 is extracted from the resource identifier 691. In a fourth exemplary embodiment of the present invention, as described with reference to FIG. 6D above, the destination server host name 404 is extracted from the cookie field 655, and the absolute path 406 is extracted from either the location field 650 (if the cache server absolute path 653 is identical to the absolute path 406) or the cookie field 655.

After extracting the destination server host name and absolute path from the HTTP GET request 506, in step 1106, the cache server control logic 1004 uses the destination server host name and absolute path to determine whether or not the requested information is stored in its cache memory, in step 1108. If the requested information is in the cache memory (YES in step 1110), then the cache server control logic 1004 proceeds to step 1116. If the requested information is not stored in the cache memory (NO in step 1110), then the cache server control logic 1004 proceeds to retrieve the requested information from the destination server 110 and store the retrieved information in the cache memory. Specifically, in step 1112, the cache server control logic 1004 sends to the destination server 110 the HTTP GET request 508 including, among other things, a source address equal to the address of the cache server 304, a destination address equal to the address of the destination server 110, a host name (640, 670, 692) equal to the destination server host name (623, 404, 404, respectively), and a resource identifier (641, 671, 693) equal to the absolute path (624, 406, 683, respectively). Then, in step 1114, the cache server control logic 1004 receives from the destination server 110 the HTTP response 510 including, among other things, a source address equal to the address of the destination server 110, a destination address equal to the address of the cache server 304, and the requested information. Upon receiving the HTTP response 510 in step 1114, the cache server control logic 1004 stores the retrieved information in the cache memory, in step 1115, and proceeds to step 1116.

In step 1116, the cache server control logic 1004 formats the HTTP response 512 including, among other things, a source address equal to the address of the cache server 304, a destination address equal to the address of the client 102, and the requested information that was either stored in the cache memory or retrieved from the destination server 110. The cache server control logic then sends the HTTP response 512 to the client 102, in step 1118, and terminates in step 1199.

In a preferred embodiment of the present invention, the redirection model is applied to caching in the context of "web" browsing, specifically using HTTP. However, it will be apparent to a skilled artisan that the techniques of the present invention can be applied in other contexts using HTTP or another such protocol that supports a redirection response. Thus, the techniques of the present invention may be applied to directory access using the Lightweight Directory Access Protocol (LDAP). Other alternative contexts and protocols will become apparent to the skilled artisan.

The exemplary embodiments described with reference to FIGS. 6A, 6B, 6C, and 6D are included to illustrate a variety of techniques by which the destination server host name and absolute path can be conveyed to the cache server 304 through the redirection mechanism. However, the present invention is in no way limited to the specific techniques and message formats shown therein. In one alternative embodiment, which is a variation of the exemplary embodiment described and illustrated with reference to FIG. 6A, the cache server indicator 620 in the HTTP redirect response 504 includes a cache server absolute path, similar to the cache server absolute path 653 described with reference to FIG. 6B. In another alternative embodiment, which is a variation of the exemplary embodiment described and illustrated with reference to FIG. 6C, multiple destination server host names, including the destination server host name 404, map to the cache server host name 682, and the destination server host name is included in the host name 690 in such a way as it is not mistaken as the cache server host name (for example, by delimiting the destination server host name 404, e.g. "www!destination-server!com.cache-server.com"). In still another alternative embodiment, which is a combination of the techniques described and illustrated with reference to FIGS. 6C and 6D, the cache server host name 652 within the cache server indicator 650 (described with reference to FIG. 6D) uniquely maps to the destination server host name using the technique described with reference to FIG. 6C, and the cookie field 654 is used to convey only the absolute path. Of course, many other alternative techniques and message formats are possible. For example, the information conveyed within certain message fields may be rearranged, or different HTTP message fields may be used to convey certain information. These and other such alternative techniques and message formats will become apparent to the skilled artisan.

In a preferred embodiment of the present invention, substantially all of the interceptor control logic 704 is implemented as a set of program instructions that are stored in a computer readable memory within the interceptor 302 and executed on a microprocessor within the interceptor 302. Likewise, in a preferred embodiment of the present invention, substantially all of the cache server control logic 1004 is implemented as a set of program instructions that are stored in a computer readable memory within the cache server 304 and executed on a microprocessor within the cache server 304. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable medium (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to considered in all respects only as illustrative and not restrictive.

I claim:

1. In an interceptor situated between a client and a destination server in a communication network, a caching method comprising the steps of:

intercepting a request message directed by the client to the destination server, the request message including at least a destination server indicator identifying the destination server;

selecting a cache server to process the intercepted request message;

formatting a response message including a cache server indicator, the cache server indicator identifying at least the selected cache server and permitting the client to transmit to the selected cache server a further request message which specifies that the client intends for the selected cache server to receive the further request message; and transmitting the response message to the client.

2. The caching method of claim 1 wherein the step of selecting the cache server to process the intercepted request message comprises utilizing the destination server indicator to select the cache server from among a plurality of cache servers.

3. The caching method of claim 2 wherein the cache server indicator comprises a cache server host name corresponding to the selected cache server.

4. The caching method of claim 3 wherein the cache server host name uniquely maps to the destination server.

5. The caching method of claim 1 wherein the request message is a HyperText Transfer Protocol (HTTP) GET request message comprising a destination server host name identifying the destination server and an absolute path identifying a specific resource stored in the destination server.

6. The caching method of claim 5 wherein the HTTP GET request message further comprises an Internet Protocol header, comprising a source Internet Protocol address equal to an Internet Protocol address of the client and a destination Internet Protocol address equal to an Internet Protocol address of the destination server, and a Transmission Control Protocol header, comprising a Transmission Control Protocol port number, and wherein the step of intercepting the request message comprises determining that the Transmission Control Protocol port number is equal to a well-known HTTP port number and further determining that neither the source Internet Protocol address nor the destination Internet Protocol address is equal to an Internet Protocol address of the cache server.

7. The caching method of claim 5 wherein the response message is an HTTP redirect response message including the cache server indicator.

8. The caching method of claim 7 wherein the cache server indicator comprises a cache server host name equal to one of:

a domain name for the cache server; and an Internet Protocol address for the cache server.

9. The caching method of claim 8 wherein the HTTP redirect response further comprises a reference to the requested information stored in the destination server.

10. The caching method of claim 9 wherein the reference to the requested information stored in the destination server comprises the destination server host name from the HTTP GET request.

11. The caching method of claim 9 wherein the reference to the requested information stored in the destination server comprises the absolute path from the HTTP GET request.

12. The caching method of claim 9 wherein the reference to the requested information stored in the destination server is included in the cache server indicator.

13. The caching method of claim 9 wherein the reference to the requested information stored in the destination server is included in a cookie field within the HTTP redirect response.

14. The caching method of claim 7 wherein the step of transmitting the response message comprises the steps of:

formatting the cache server indicator;

formatting the HTTP redirect response message including at least the cache server indicator; and adding to the HTTP redirect response message a Transmission Control Protocol header, comprising a Transmission Control Protocol port number equal to the well-known HTTP port number, and an Internet Protocol header, comprising a destination Internet Protocol address equal to the Internet Protocol address of the client and a source Internet Protocol address equal to the Internet Protocol address of the destination server.

15. The caching method of claim 1 further comprising the steps of:

establishing a Transmission Control Protocol session with the client prior to intercepting the request message;

maintaining a Transmission Control Protocol session state for the duration of the Transmission Control Protocol session; and terminating the Transmission Control Protocol session with the client after transmitting the response message.

16. An interceptor for operation between a client and a destination server in a communication network, the interceptor comprising:

at least one network interface; and interceptor control logic operably coupled to the at least one network interface, wherein the interceptor control logic comprises:

intercepting logic responsive to the at least one network interface and operably coupled to intercept a request message directed by the client to the destination server, the request message including a destination server indicator identifying at least the destination server;

selecting logic responsive to the intercepting logic and operably coupled to select a cache server to process the intercepted request message;

formatting logic responsive to the selecting logic and operably coupled to format a response message to the client including a cache server indicator the cache server indicator identifying at least the selected cache server and permitting the client to transmit to the selected cache server a further request message which specifies that the client intends for the selected cache server to receive the further request message; and transmitting logic responsive to the formatting logic and operably coupled to transmit the response message onto the at least one network interface.

17. The interceptor of claim 16 wherein the selecting logic comprises logic for utilizing the destination server indicator to select the cache server from among a plurality of cache servers.

18. The interceptor of claim 17 wherein the cache server indicator comprises a cache server host name corresponding to the selected cache server.

19. The interceptor of claim 18 wherein the cache server host name uniquely maps to the destination server.

20. The interceptor of claim 16 wherein the request message is a HyperText Transfer Protocol (HTTP) GET request message comprising a destination server host name identifying the destination server and an absolute path identifying a specific resource stored in the destination server.

21. The interceptor of claim 20 wherein the HTTP GET request message further comprises an Internet Protocol header, comprising a source Internet Protocol address equal to an Internet Protocol address of the client and a destination Internet Protocol address equal to an Internet Protocol address of the destination server, and a Transmission Control Protocol header, comprising a Transmission Control Protocol port number, and wherein the intercepting logic comprises logic for determining that the Transmission Control Protocol port number is equal to a well-known HTTP port number and further comprising logic for determining that neither the source Internet Protocol address nor the destination Internet Protocol address is equal to an Internet Protocol address of the cache server.

22. The interceptor of claim 20 wherein the response message is an HTTP redirect response message including the cache server indicator.

23. The interceptor of claim 22 wherein the cache server indicator comprises a cache server host name equal to one of:

a domain name for the cache server; and an Internet Protocol address for the cache server.

24. The interceptor of claim 23 wherein the HTTP redirect response further comprises a reference to the requested information stored in the destination server.

25. The interceptor of claim 24 wherein the reference to the requested information stored in the destination server comprises the destination server host name from the HTTP GET request.

26. The interceptor of claim 24 wherein the reference to the requested information stored in the destination server comprises the absolute path from the HTTP GET request.

27. The interceptor of claim 24 wherein the reference to the requested information stored in the destination server is included in the cache server indicator.

28. The interceptor of claim 24 wherein the reference to the requested information stored in the destination server is included in a cookie field within the HTTP redirect response.

29. The interceptor of claim 22 wherein the transmitting logic comprises:

logic for formatting the cache server indicator;

logic for formatting the HTTP redirect response message including at least the cache server indicator; and logic for adding to the HTTP redirect response message a Transmission Control Protocol header, comprising a Transmission Control Protocol port number equal to the well-known HTTP port number, and an Internet Protocol header, comprising a destination Internet Protocol address equal to the Internet Protocol address of the client and a source Internet Protocol address equal to the Internet Protocol address of the destination server.

30. The interceptor of claim 16 further comprising:

logic for establishing a Transmission Control Protocol session with the client prior to intercepting the request message;

logic for maintaining a Transmission Control Protocol session state for the duration of the Transmission Control Protocol session; and logic for terminating the Transmission Control Protocol session with the client after transmitting the response message.

31. The interceptor of claim 16 wherein the interceptor control logic comprises:

means for intercepting a request message transmitted by the client and destined for the destination server, the request message including a destination server indicator identifying at least the destination server;

means for selecting a cache server to process the intercepted request message;

means for formatting a response message including a cache server indicator identifying at least the cache server; and means for transmitting the response message to the client.

32. A program product comprising a computer readable medium having embodied therein a computer readable program for redirecting client requests to a cache server, the computer readable program comprising:

computer readable program code means for intercepting a request message directed by the client to a destination server, the request message including a destination server indicator identifying at least the destination server;

computer readable program code means for selecting a cache server to process the intercepted request message;

computer readable program code means for formatting a response message including a cache server indicator identifying at least the selected cache server; and computer readable program code means for transmitting the response message to the client, the cache server indicator permitting the client to transmit to the selected cache server a further request message which specifies that the client intends for the selected cache server to receive the further request message.

33. The program product of claim 32 wherein the computer readable program code means for selecting the cache server to process the intercepted request message comprises computer readable program code means for utilizing the destination server indicator to select the cache server from among a plurality of cache servers.

34. The program product of claim 33 wherein the cache server indicator comprises a cache server host name corresponding to the selected cache server.

35. The program product of claim 34 wherein the cache server host name uniquely maps to the destination server.

36. The program product of claim 32 wherein the request message is a HyperText Transfer Protocol (HTTP) GET request message comprising a destination server host name identifying the destination server and an absolute path identifying a specific resource stored in the destination server.

37. The program product of claim 36 wherein the HTTP GET request message further comprises an Internet Protocol header, comprising a source Internet Protocol address equal to an Internet Protocol address of the client and a destination Internet Protocol address equal to an Internet Protocol address of the destination server, and a Transmission Control Protocol header, comprising a Transmission Control Protocol port number, and wherein the computer readable program code means for intercepting the request message comprises computer readable program code means for determining that the Transmission Control Protocol port number is equal to a well-known HTTP port number and further comprises computer readable program code means for determining that neither the source Internet Protocol address nor the destination Internet Protocol address is equal to an Internet Protocol address of the cache server.

38. The program product of claim 36 wherein the response message is an HTTP redirect response message including the cache server indicator.

39. The program product of claim 38 wherein the cache server indicator comprises a cache server host name equal to one of:

a domain name for the cache server; and an Internet Protocol address for the cache server.

40. The program product of claim 39 wherein the HTTP redirect response further comprises a reference to the requested information stored in the destination server.

41. The program product of claim 40 wherein the reference to the requested information stored in the destination server comprises the destination server host name from the HTTP GET request.

42. The program product of claim 40 wherein the reference to the requested information stored in the destination server comprises the absolute path from the HTTP GET request.

43. The program product of claim 40 wherein the reference to the requested information stored in the destination server is included in the cache server indicator.

44. The program product of claim 40 wherein the reference to the requested information stored in the destination server is included in a cookie field within the HTTP redirect response.

45. The program product of claim 38 wherein the computer readable program code means for transmitting the response message comprises:

computer readable program code means for formatting the cache server indicator;

computer readable program code means for formatting the HTTP redirect response message including at least the cache server indicator; and computer readable program code means for adding to the HTTP redirect response message a Transmission Control Protocol header, comprising a Transmission Control Protocol port number equal to the well-known HTTP port number, and an Internet Protocol header, comprising a destination Internet Protocol address equal to the Internet Protocol address of the client and a source Internet Protocol address equal to the Internet Protocol address of the destination server.

46. The program product of claim 32 further comprising:

computer readable program code means for establishing a Transmission Control Protocol session with the client prior to intercepting the request message;

computer readable program code means for maintaining a Transmission Control Protocol session state for the duration of the Transmission Control Protocol session; and computer readable program code means for terminating the Transmission Control Protocol session with the client after transmitting the response message.

47. In a cache server for operation in a communication network having an interceptor situated between a client and a destination server, a method comprising the steps of:

receiving a first request message directed by the client to the cache server and requesting information stored in the destination server, the first request message having been transmitted by the client to the cache server in response to information that the interceptor transmitted to the client in response to a request message that was transmitted by the client to the destination server and was intercepted by the interceptor, said information including a cache server indicator which identifies the cache server;

extracting from the first request message a reference to the requested information stored in the destination server;

retrieving the requested information;

formatting a first response message including the requested information; and transmitting the first response message to the client.

48. The method of claim 47 wherein the step of retrieving the requested information comprises the steps of:
  determining that the requested information is stored by the cache server in a cache memory; and
  retrieving the requested information from the cache memory.

49. The method of claim 47 wherein the step of retrieving the requested information comprises the steps of:
  determining that the requested information is not stored by the cache server in a cache memory; and
  retrieving the requested information from the destination server.

50. The method of claim 49 further comprising the step of storing the requested information retrieved from the destination server in the cache memory.

51. The method of claim 49 wherein the step of retrieving the requested information from the destination server comprises the steps of:
  sending to the destination server a second request message identifying the requested information stored in the destination server; and
  receiving from the destination server a second response message including the requested information.

52. The method of claim 47 wherein the first request message is a first HyperText Transfer Protocol (HTTP) GET request message and wherein the first response message is a first HTTP response message.

53. The method of claim 52 wherein the reference comprises a destination server host name identifying the destination server and an absolute path identifying a resource within the destination server, and wherein the step of extracting from the first request message the reference to the requested information stored in the destination server comprises:
  extracting the destination server host name from the first request message; and
  extracting the absolute path from the first request message.

54. The method of claim 53 wherein the first request message includes the destination server host name.

55. The method of claim 54 wherein the first request message comprises a resource identifier field including the destination server host name, and wherein the step of extracting the destination server host name from the first request message comprises extracting the destination server host name from the resource identifier field.

56. The method of claim 54 wherein the first request message comprises a referrer field including the destination server host name, and wherein the step of extracting the destination server host name from the first request message comprises extracting the destination server host name from the referrer field.

57. The method of claim 54 wherein the first request message comprises a cookie field including the destination server host name, and wherein the step of extracting the destination server host name from the first request message comprises extracting the destination server host name from the cookie field.

58. The method of claim 53 wherein the first request message includes a cache server host name that uniquely identifies the destination server host name.

59. The method of claim 58 wherein the reference comprises a host name field including the cache server host name, and wherein the step of extracting the destination server host name from the first request message comprises:
  extracting the cache server host name from the host name field; and
  mapping the cache server host name to the destination server host name.

60. The method of claim 53 wherein the first request message includes the absolute path.

61. The method of claim 60 wherein the first request message comprises a resource identifier field including the absolute path, and wherein the step of extracting the absolute path from the first request message comprises extracting the absolute path from the resource identifier field.

62. The method of claim 60 wherein the first request message comprises a referrer field including the absolute path, and wherein the step of extracting the absolute path from the first request message comprises extracting the absolute path from the referee field.

63. The method of claim 60 wherein the first request message comprises a cookie field including the absolute path, and wherein the step of extracting the absolute path from the first request message comprises extracting the absolute path from the cookie field.

64. The method of claim 53 wherein the step of retrieving the requested information comprises the steps of:
  using the extracted destination server host name and absolute path to determine that the requested information is stored by the cache server in a cache memory; and
  retrieving the requested information from the cache memory.

65. The method of claim 53 wherein the step of retrieving the requested information comprises the steps of:
  using the extracted destination server host name and absolute path to determine that the requested information is not stored by the cache server in a cache memory; and
  retrieving the requested information from the destination server.

66. The method of claim 65 wherein the step of retrieving the requested information from the destination server comprises the steps of:
  sending to the destination server a second HTTP request message including the destination server host name and the absolute path; and
  receiving from the destination server a second HTTP response message including the requested information.

67. The method of claim 65 further comprising the step of storing the requested information retrieved from the destination server in the cache memory.

68. A cache server for operation in a communication network having an interceptor situated between a client and a destination server, the cache server comprising:
  at least one network interface; and
  cache server control logic operably coupled to the at least one network interface, wherein the cache server control logic comprises:
  receiving logic responsive to the at least one network interface and operably coupled to receive a first request message directed by the client to the cache server and requesting information stored in the destination server, the first request message having been transmitted by the client to the cache server in response to information that the interceptor transmitted to the client in response to a request message that was transmitted by the client to the destination server and was intercepted by the interceptor, said information including a cache server indicator which identifies the cache server;
  extracting logic responsive to the receiving logic and operably coupled to extract from the first request message a reference to the requested information stored in the destination server;

retrieving logic responsive to the extracting logic and operably coupled to retrieve the requested information;

formatting logic responsive to the retrieving logic and operably coupled to format a first response message including the requested information from the destination server; and transmitting logic responsive to the formatting logic and operably coupled to transmit the first response message over the at least one network interface.

69. The cache server of claim 68 wherein the retrieving logic comprises:

logic for determining that the requested information is stored by the cache server in a cache memory; and logic for retrieving the requested information from the cache memory.

70. The cache server of claim 68 wherein the retrieving logic comprises:

logic for determining that the requested information is not stored by the cache server in a cache memory; and logic for retrieving the requested information from the destination server.

71. The cache server of claim 70 wherein the retrieving logic further comprises logic for storing the requested information retrieved from the destination server in the cache memory.

72. The cache server of claim 70 wherein the logic for retrieving the requested information from the destination server:

logic for sending to the destination server a second request message identifying the requested information stored in the destination server; and logic for receiving from the destination server a second response message including the requested information.

73. The cache server of claim 68 wherein the first request message is a first HyperText Transfer Protocol (HTTP) GET request message and wherein the first response message is a first HTTP response message.

74. The cache server of claim 73 wherein the reference comprises a destination server host name identifying the destination server and an absolute path identifying a resource within the destination server, and wherein the extracting logic comprises:

logic for extracting the destination server host name from the first request message; and logic for extracting the absolute path from the first request message.

75. The cache server of claim 74 wherein the first request message includes the destination server host name.

76. The cache server of claim 75 wherein the first request message comprises a resource identifier field including the destination server host name, and wherein the logic for extracting the destination server host name from the first request message comprises logic for extracting the destination server host name from the resource identifier field.

77. The cache server of claim 75 wherein the first request message comprises a referee field including the destination server host name, and wherein the logic for extracting the destination server host name from the first request message comprises logic for extracting the destination server host name from the referee field.

78. The cache server of claim 75 wherein the first request message comprises a cookie field including the destination server host name, and wherein the logic for extracting the destination server host name from the first request message comprises logic for extracting the destination server host name from the cookie field.

79. The cache server of claim 74 wherein the first request message includes a cache server host name that uniquely identifies the destination server host name.

80. The cache server of claim 79 wherein the reference comprises a host name field including the cache server host name, and wherein the logic for extracting the destination server host name from the first request message comprises:

logic for extracting the cache server host name from the host name field; and logic for mapping the cache server host name to the destination server host name.

81. The cache server of claim 80 wherein the first request message comprises a referee field including the absolute path, and wherein the logic for extracting the absolute path from the first request message comprises logic for extracting the absolute path from the referee field.

82. The cache server of claim 80 wherein the first request message comprises a cookie field including the absolute path, and wherein the logic for extracting the absolute path from the first request message comprises logic for extracting the absolute path from the cookie field.

83. The cache server of claim 74 wherein the first request message includes the absolute path.

84. The cache server of claim 83, wherein the first request message comprises a resource identifier field including the absolute path, and wherein the logic for extracting the absolute path from the first request message comprises logic for extracting the absolute path from the resource identifier field.

85. The cache server of claim 74 wherein the retrieving logic comprises:

logic for using the extracted destination server host name and absolute path to determine that the requested information is stored by the cache server in a cache memory; and logic for retrieving the requested information from the cache memory.

86. The cache server of claim 74 wherein the retrieving logic comprises:

logic for using the extracted destination server host name and absolute path to determine that the requested information is not stored by the cache server in a cache memory; and logic for retrieving the requested information from the destination server.

87. The cache server of claim 86 wherein the logic for retrieving the requested information from the destination server comprises:

logic for sending to the destination server a second HTTP request message including the destination server host name and the absolute path; and logic for receiving from the destination server a second HTTP response message including the requested information.

88. The cache server of claim 86 wherein the retrieving logic further comprises logic for storing the requested information retrieved from the destination server in the cache memory.

89. The cache server of claim 68 wherein the cache server control logic comprises:

means for receiving a first request message directed by the client to the cache server and requesting information stored in the destination server;

means for extracting from the first request message a reference to the requested information stored in the destination server;

means for retrieving the requested information;

means for formatting a first response message including the requested information from the destination server; and means for transmitting the first response message over the at least one network interface.

90. A program product comprising a computer readable medium having embodied therein a computer readable program for processing a redirected request from a client, the computer readable program comprising:

computer readable program code means for receiving a first request message directed by the client to a cache server and requesting information stored in a destination server, the first request message having been transmitted by the client to the cache server in response to information that an interceptor transmitted to the client in response to a request message that was transmitted by the client to the destination server and was intercepted by the interceptor, said information including a cache server indicator which identifies the cache server;

computer readable program code means for extracting from the first request message a reference to the requested information stored in the destination server;

computer readable program code means for retrieving the requested information;

computer readable program code means for formatting a first response message including the requested information; and computer readable program code means for transmitting the first response message to the client.

91. The program product of claim 90 wherein the computer readable program code means for retrieving the requested information comprises:

computer readable program code means for determining that the requested information is stored by the cache server in a cache memory; and computer readable program code means for retrieving the requested information from the cache memory.

92. The program product of claim 90 wherein the computer readable program code means for retrieving the requested information comprises:

computer readable program code means for determining that the requested information is not stored by the cache server in a cache memory; and computer readable program code means for retrieving the requested information from the destination server.

93. The program product of claim 92 wherein the computer readable program code means for retrieving the requested information from the destination server further comprises computer readable program code means for storing the requested information retrieved from the destination server in a cache memory.

94. The program product of claim 92 wherein the computer readable program code means for retrieving the requested information from the destination server comprises:

computer readable program code means for sending to the destination server a second request message identifying the requested information stored in the destination server; and computer readable program code means for receiving from the destination server a second response message including the requested information.

95. The program product of claim 90 wherein the first request message is a first HyperText Transfer Protocol (HTTP) GET request message and wherein the first response message is a first HTTP response message.

96. The program product of claim 95 wherein the reference comprises a destination server host name identifying the destination server and an absolute path identifying a resource within the destination server, and wherein the computer readable program code means for extracting from the first request message the reference to the requested information stored in the destination server comprises:

computer readable program code means for extracting the destination server host name from the first request message; and computer readable program code means for extracting the absolute path from the first request message.

97. The program product of claim 96 wherein the first request message includes the destination server host name.

98. The program product of claim 97 wherein the first request message comprises a resource identifier field including the destination server host name, and wherein the computer readable program code means for extracting the destination server host name from the first request message comprises computer readable program code means for extracting the destination server host name from the resource identifier field.

99. The program product of claim 97 wherein the first request message comprises a referee field including the destination server host name, and wherein the computer readable program code means for extracting the destination server host name from the first request message comprises computer readable program code means for extracting the destination server host name from the referee field.

100. The program product of claim 97 wherein the first request message comprises a cookie field including the destination server host name, and wherein the computer readable program code means for extracting the destination server host name from the first request message comprises computer readable program code means for extracting the destination server host name from the cookie field.

101. The program product of claim 96 wherein the first request message includes a cache server host name that uniquely identifies the destination server host name.

102. The program product of claim 101 wherein the reference comprises a host name field including the cache server host name, and wherein the computer readable program code means for extracting the destination server host name from the first request message comprises:

computer readable program code means for extracting the cache server host name from the host name field; and computer readable program code means for mapping the cache server host name to the destination server host name.

103. The program product of claim 96 wherein the first request message includes the absolute path.

104. The program product of claim 103 wherein the first request message comprises a resource identifier field including the absolute path, and wherein the computer readable program code means for extracting the absolute path from the first request message comprises computer readable program code means for extracting the absolute path from the resource identifier field.

105. The program product of claim 103 wherein the first request message comprises a referee field including the absolute path, and wherein the computer readable program code means for extracting the absolute path from the first request message comprises computer readable program code means for extracting the absolute path from the referee field.

106. The program product of claim 103 wherein the first request message comprises a cookie field including the absolute path, and wherein the computer readable program code means for extracting the absolute path from the first request message comprises computer readable program code means for extracting the absolute path from the cookie field.

107. The program product of claim 96 wherein the computer readable program code means for retrieving the requested information comprises:
   computer readable program code means for using the extracted destination server host name and absolute path to determine that the requested information is stored by the cache server in a cache memory; and
   computer readable program code means for retrieving the requested information from the cache memory.

108. The program product of claim 96 wherein the computer readable program code means for retrieving the requested information comprises:
   computer readable program code means for using the extracted destination server host name and absolute path to determine that the requested information is not stored by the cache server in a cache memory; and
   computer readable program code means for retrieving the requested information from the destination server.

109. The program product of claim 108 wherein the computer readable program code means for retrieving the requested information from the destination server comprises:
   computer readable program code means for sending to the destination server a second HTTP request message including the destination server host name and the absolute path; and
   computer readable program code means for receiving from the destination server a second HTTP response message including the requested information.

110. The program product of claim 108 wherein the computer readable program code means for retrieving the requested information from the destination server further comprises computer readable program code means for storing the requested information retrieved from the destination server in the cache memory.

111. In a communication network having an interceptor situated between a client and a destination server, a caching method comprising the steps of:
   transmitting, by the client to the destination server, a first request message requesting information stored in the destination server, the first request message including a first reference to the requested information stored in the destination server;
   intercepting the first request message by the interceptor;
   selecting, by the interceptor, a cache server to process the intercepted first request message;
   transmitting, by the interceptor to the client, a first response message which includes a cache server indicator for identifying the cache server and redirecting the client to the cache server;
   receiving the first response message by the client;
   transmitting, by the client to the cache server, a second request message including a second reference to the requested information stored in the destination server;
   receiving the second request message by the cache server;
   retrieving the requested information by the cache server; and
   transmitting, by the cache server to the client, a second response message including the requested information.

112. The method of claim 111 wherein:
   the first request message is a first HyperText Transfer Protocol (HTTP) request message and the first reference comprises a host name field indicating a destination server host name and an absolute path identifying a specific resource in the destination server;
   the first response message is an HTTP redirect response message including at least a cache server host name for the cache server;
   the second request message is a second HTTP request message and the second reference identifies the destination server and the specific resource in the destination server; and
   the second response message is an HTTP response message.

113. The method of claim 112 wherein the second request message comprises the destination server host name identifying the destination server, and further comprises the absolute path identifying the specific resource in the destination server.

114. The method of claim 112 wherein the second request message comprises a cache server host name equal to a host name of the cache server and uniquely identifying the destination server, and further comprises the absolute path identifying the specific resource in the destination server.

115. The method of claim 112 further comprising, between the steps of receiving the second request message by the cache server and transmitting the second response message by the cache server, the steps of:
   transmitting, by the cache server to the destination server, a third request message requesting information from the destination server;
   receiving the third request message by the destination server;
   transmitting, by the destination server to the cache server, a third response message including the requested information; and
   receiving the third response message by the cache server.

116. The method of claim 115 wherein:
   the third request message comprises the destination server host name identifying the destination server, and further comprises the absolute path identifying the specific resource in the destination server; and
   the third response message is a second HTTP response message.

117. A system for caching in a communication network, the system comprising:
   an interceptor;
   a client in communication with the interceptor:
   a cache server in communication with the client; and
   a destination server in communication with the cache server, wherein:
   the client transmits a first request message requesting information from the destination server, the first request message including a first reference to the requested information stored in the destination server;
   the interceptor intercepts the first request message;
   the interceptor selects a cache server to process the intercepted first request message;
   the interceptor transmits to the client a first response message which includes a cache server indicator for identifying the cache server and redirecting the client to the cache server;
   the client receives the first response message;

the client transmits to the cache server a second request message including a second reference to the requested information stored in the destination server;

the cache server receives the second request message; and the cache server transmits to the client a second response message including the requested information.

118. The system of claim 117 wherein:

the first request message is a first HyperText Transfer Protocol (HTTP) request message and the first reference comprises a host name field indicating a destination server host name and an absolute path identifying a specific resource in the destination server;

the first response message is an HTTP redirect response message including at least a cache server host name for the cache server;

the second request message is a second HTTP request message and the second reference identifies the destination server and the specific resource in the destination server; and the second response message is an HTTP response message.

119. The system of claim 118 wherein the second request message comprises the destination server host name identifying the destination server, and further comprises the absolute path identifying the specific resource in the destination server.

120. The system of claim 118 wherein the second request message comprises a cache server host name equal to a host name of the cache server and uniquely identifying the destination server, and further comprises the absolute path identifying the specific resource in the destination server.

121. The system of claim 118 wherein:

the cache server transmits to the destination server a third request message requesting the information from the destination server;

the destination server receives the third request message;

the destination server transmits to the cache server a third response message including the requested information; and the cache server receives the third response message.

122. The system of claim 121 wherein:

the third request message comprises the destination server host name identifying the destination server, and further comprises the absolute path identifying the specific resource in the destination server; and the third response message is a second HTTP response message.

\* \* \* \* \*

UNITED STATES PATENT AND TRADEMARK OFFICE
CERTIFICATE OF CORRECTION

PATENT NO. : 7,080,158 B1
APPLICATION NO. : 09/247192
DATED : July 18, 2006
INVENTOR(S) : Matthew Squire It is certified that error appears in the above-identified patent and that said Letters Patent is hereby corrected as shown below:

Column 5, line 64, delete "over the" (second occurrence).

Column 7, line 17, delete "10" and insert -- 110 --.

Column 27, Claim 56, line 48, delete "referrer" and insert -- referer --.

Column 27, Claim 56, line 52, delete "referrer" and insert -- referer --.

Column 28, Claim 62, line 11, delete "referrer" and insert -- referer --.

Column 28, Claim 63, line 14, delete "referrer" and insert -- referer --.

Column 29, Claim 77, line 60, delete "referree" and insert -- referer --.

Column 29, Claim 77, line 64, delete "referree" and insert -- referer --.

Column 30, Claim 81, line 16, delete "referree" and insert -- referer --.

Column 30, Claim 81, line 19, delete "referree" and insert -- referer --.

Column 32, Claim 99, line 27, delete "referree" and insert -- referer --.

Column 32, Claim 99, line 32, delete "referree" and insert -- referer --.

Column 32, Claim 105, line 63, delete "referree" and insert -- referer --.

UNITED STATES PATENT AND TRADEMARK OFFICE
CERTIFICATE OF CORRECTION

PATENT NO. : 7,080,158 B1
APPLICATION NO. : 09/247192
DATED : July 18, 2006
INVENTOR(S) : Matthew Squire It is certified that error appears in the above-identified patent and that said Letters Patent is hereby corrected as shown below:

Column 32, Claim 105, line 67, delete "referree" and insert -- referer --.

Signed and Sealed this

Twenty-seventh Day of February, 2007

JON W. DUDAS
*Director of the United States Patent and Trademark Office*